(12) United States Patent
Aski et al.

(10) Patent No.: US 8,504,513 B2
(45) Date of Patent: Aug. 6, 2013

(54) AUTO-GENERATION OF CODE FOR PERFORMING A TRANSFORM IN AN EXTRACT, TRANSFORM, AND LOAD PROCESS

(75) Inventors: Vijaykumar K Aski, Bellevue, WA (US); Danny Chen, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 344 days.

(21) Appl. No.: 12/625,573

(22) Filed: Nov. 25, 2009

(65) Prior Publication Data

US 2011/0125705 A1  May 26, 2011

(51) Int. Cl.
   *G06F 7/00* (2006.01)
   *G06F 17/00* (2006.01)
(52) U.S. Cl.
   USPC .......................................... 707/602; 707/601
(58) Field of Classification Search
   None
   See application file for complete search history.

(56) References Cited

U.S. PATENT DOCUMENTS

| | | | |
|---|---|---|---|
| 6,189,004 B1 | 2/2001 | Rassen et al. | |
| 6,609,123 B1* | 8/2003 | Cazemier et al. | 1/1 |
| 6,704,747 B1* | 3/2004 | Fong | 1/1 |
| 6,732,095 B1 | 5/2004 | Warshavsky et al. | |
| 6,963,826 B2 | 11/2005 | Hanaman et al. | |
| 7,089,266 B2 | 8/2006 | Stolle et al. | |
| 7,133,865 B1 | 11/2006 | Pedersen et al. | |
| 7,152,070 B1 | 12/2006 | Musick et al. | |
| 7,181,440 B2 | 2/2007 | Cras et al. | |
| 7,313,561 B2 | 12/2007 | Lo et al. | |
| 7,386,567 B2* | 6/2008 | Manikutty et al. | 1/1 |
| 7,461,077 B1* | 12/2008 | Greenwood | 1/1 |
| 7,490,093 B2 | 2/2009 | Jain et al. | |
| 7,490,334 B2 | 2/2009 | Shapiro et al. | |
| 7,657,549 B2 | 2/2010 | Morris et al. | |
| 7,657,576 B1* | 2/2010 | Norcott | 707/999.202 |
| 2002/0161778 A1 | 10/2002 | Linstedt | |
| 2003/0014397 A1 | 1/2003 | Chau et al. | |
| 2004/0093344 A1* | 5/2004 | Berger et al. | 707/102 |

(Continued)

FOREIGN PATENT DOCUMENTS

WO  0057311 A2  12/2000

OTHER PUBLICATIONS

Paulraj Ponnia "Data Warehousing Fundamentals A Comprehensive Guide for IT Professionals" 2001, John Wiley & Sons, Inc., pp. 257-289.*

(Continued)

*Primary Examiner* — Polina Peach
(74) *Attorney, Agent, or Firm* — Hope Baldauff Hartman, LLC

(57) ABSTRACT

A mapping is received and stored that maps elements of a data warehouse to types of a type system implemented by a data source. Program code is generated that performs a transform of data retrieved from a data source based on the mapping. Generation of the program code may include generating program code for performing a dimension transform based on the mapping, generating program code for performing a fact transform based on the mapping, and generating program code for performing an outrigger transform based on the mapping. The generated program code may then be executed to transform the data retrieved from the data source prior to loading into the data warehouse.

14 Claims, 12 Drawing Sheets

(56) References Cited

U.S. PATENT DOCUMENTS

| | | | |
|---|---|---|---|
| 2004/0163041 A1 | 8/2004 | Engel | |
| 2004/0205727 A1* | 10/2004 | Sit et al. | 717/125 |
| 2004/0215626 A1 | 10/2004 | Colossi et al. | |
| 2005/0004896 A1 | 1/2005 | Cseri et al. | |
| 2005/0050074 A1 | 3/2005 | Jain et al. | |
| 2005/0055336 A1 | 3/2005 | Hui et al. | |
| 2005/0114248 A1 | 5/2005 | Dupont et al. | |
| 2005/0138081 A1* | 6/2005 | Alshab et al. | 707/200 |
| 2005/0256892 A1* | 11/2005 | Harken | 707/101 |
| 2006/0101423 A1 | 5/2006 | Aharoni et al. | |
| 2006/0212335 A1 | 9/2006 | Stier | |
| 2007/0022093 A1 | 1/2007 | Wyatt et al. | |
| 2007/0112802 A1* | 5/2007 | Volanen et al. | 707/100 |
| 2007/0136330 A1* | 6/2007 | Lecheler-Moore et al. | 707/100 |
| 2007/0174308 A1 | 7/2007 | Rausch | |
| 2007/0211056 A1* | 9/2007 | Chakraborty et al. | 345/440 |
| 2007/0214111 A1 | 9/2007 | Jin et al. | |
| 2007/0239769 A1* | 10/2007 | Fazal et al. | 707/102 |
| 2008/0040181 A1* | 2/2008 | Freire et al. | 705/8 |
| 2008/0086446 A1* | 4/2008 | Zhang et al. | 707/2 |
| 2008/0092112 A1 | 4/2008 | Jin et al. | |
| 2008/0168082 A1 | 7/2008 | Jin et al. | |
| 2008/0294996 A1* | 11/2008 | Hunt et al. | 715/739 |
| 2009/0281985 A1* | 11/2009 | Aggarwal | 707/2 |

OTHER PUBLICATIONS

Christian Thomsen, Torben Bach Pedersen, Wolfgang Lehner "RiTE: Providing On-Demand Data for Right-Time Data Warehousing", ICDE 2008.*

Abello, et al., "A Data Warehouse Multidimensional Data Models Classification", Retrieved at <<http://citeseerx.ist.psu.edu/viewdoc/download:jsessionid=BACE8691E2BFCFC0313416BAD63338D4?doi=10.1.1.24.6461&rep=rep1&type=pdf>> Oct. 12, 2009, pp. 1-25.

"Informatica PowerCenter", Retrieved at <<http://www.informatica.com/products_services/powercenter/Pages/index.aspx>>, Oct. 12, 2009, pp. 1-2.

Aski, et al., "Model Based Data Warehousing and Analytics", U.S. Appl. No. 12/129,667, filed on May 29, 2008.

U.S. Official Action dated Oct. 1, 2010 in U.S. Appl. No. 12/129,667.

U.S. Official Action dated Mar. 17, 2011 in U.S. Appl. No. 12/129,667.

U.S. Official Action dated Aug. 18, 2011 in U.S. Appl. No. 12/129,667.

U.S. Official Action dated Jan. 24, 2012 in U.S. Appl. No. 12/129,667.

Tolbert, "CWM: A Model-based Architecture for Data Warehouse Interchange", 2000, Unisys Corporation, 3 pp.

* cited by examiner

AUTO-GENERATION OF CODE FOR PERFORMING A TRANSFORM IN AN EXTRACT, TRANSFORM, AND LOAD PROCESS

BACKGROUND

A data warehouse stores data that is used for reporting and analysis. This data may be collected from various data sources and placed in the data warehouse. Manual, semi-automatic, and automatic mechanisms may be used to collect the data. For example, a script might execute periodically to obtain information from a data source to place in the data warehouse. As another example, an employee may periodically copy data from a company database to the data warehouse. A data warehouse may have storage elements that correspond to information that an organization cares about. For example, a data warehouse may have a table that stores employee information retrieved from data sources.

Moving data from a data source to a data warehouse is commonly referred to as the extract, transform, and load ("ETL") process. During extraction, the data from one or more data sources is moved in its raw format to staging tables inside the data warehouse in the same raw format. Transformation then takes the raw data and performs the operations for transforming the data into a format utilized by the data warehouse. Once the data has been transformed, the data is loaded into the data warehouse, where end users can consume it.

The most complex operation in the ETL process is the transform process. Implementing the transform process is typically a very labor-intensive operation, because a user must manually author program code, such as a script, that transforms the data. Manually authoring the transform code is difficult and time-consuming for a number of reasons. First, the author must have an intimate knowledge of the data source and the data warehouse, so that the transform process can be tailored to fit within the constructs of these systems. Second, due to the complexity in transforming data from a data source to a data warehouse, there is a great likelihood that manually authored transform code might introduce errors into the transformation process. Due to these factors, and others, the complexity involved in authoring transform code in an ETL process presents a significant obstacle that precludes the widespread use of data warehouses.

It is with respect to these and other considerations that the disclosure made herein is presented.

SUMMARY

Concepts and technologies are described herein for auto-generation of code to perform a transform in an ETL process. Through an implementation of the concepts and technologies presented herein, executable program code for performing a transform in an ETL can be auto-generated. The desired transform is performed when the auto-generated program code is executed. In this manner, the requirement that a user manually author program code for performing the transform process can be eliminated through an implementation of the concepts and technologies presented herein.

According to one aspect presented herein, mapping information is received and stored that maps elements of a data warehouse to types of a type system. A type system defines a hierarchy of data types of data in a data source from which the data warehouse obtains data. Type or data type in the "type system" referenced above can refer to a class, a complex XML element type or any other construct that can be represented in an object-oriented manner. The mapping information also indicates whether existing or future subtypes of the data type are to be mapped to the elements. Using this mapping information, the elements of the data warehouse may be automatically created, maintained, and populated. In particular, the mapping information may be utilized to generate program code for extracting information from one or more data sources into a common data staging area, for transforming the extracted data for use with a data warehouse, and for loading the transformed data into the data warehouse.

According to one implementation, program code for performing a transform in an ETL process is generated using the mapping information. In particular, in one embodiment, program code is generated that performs a transform of data retrieved from the data sources based on the mapping. Generation of the program code may include generating program code for performing a dimension transform based on the mapping, generating program code for performing a fact transform based on the mapping, and generating program code for performing an outrigger transform based on the mapping. The generated program code may then be executed to transform the data retrieved from the data source prior to loading into the data warehouse. According to embodiments, the transform code is generated in such a way that it accurately reflects the warehouse target schema and automatically morphs as the target warehouse schema is changed to include new attributes or columns, have changes to the existing one, or when existing attributes or columns are removed from it, so as to always be in sync with the target schema.

According to other aspects, when a type that a dimension is pointing at changes, the dimension tables and transform scripts may be automatically updated to reflect these changes. This is a valuable benefit to a user because the user can be assured that derived types and extensions to the systems will be reflected. In a data warehouse without automated transforms, every change to the model would necessitate a manual update of each associated transform.

It should be appreciated that the above-described subject matter might also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
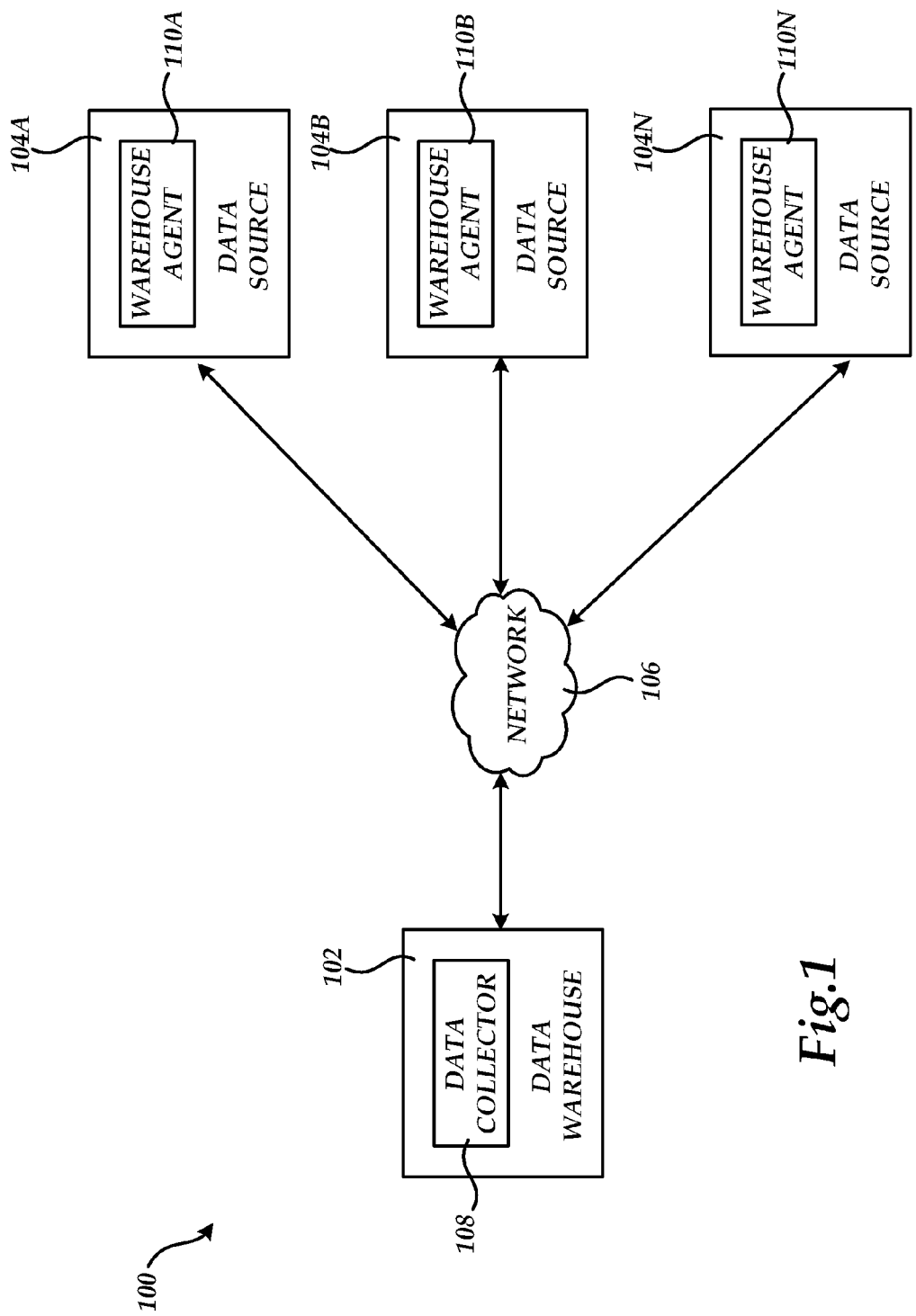
FIG. 1 is a network diagram that illustrates an example of a suitable computing environment in which aspects of the subject matter described herein may be implemented.

The following detailed description is directed to technologies for auto-generation of code for performing a transform in an ETL process. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for auto-generation of code to perform a transform in an ETL process will be presented.

FIG. 1 is a network diagram that illustrates an example of a suitable computing environment 100 in which aspects of the subject matter described herein may be implemented. The computing environment 100 is only one example of a suitable computing environment and is not intended to suggest any limitation as to the scope of use or functionality of aspects of the subject matter described herein. The illustrative environment 100 includes a data warehouse 102 and several data sources 104A-104N. The illustrative environment 100 might also include other computing systems and network elements not shown in FIG. 1. The various entities may be located relatively close to each other or may be distributed across the world. The various entities may communicate with each other via various local and wide-area networks including intra- and inter-office networks and the network 105.

The data warehouse 102 may include a data store that is capable of storing data in a structured format. As used herein, the term data is to be read broadly to include anything that may be stored on a computer storage medium. Some examples of data include information, program code, program state, program data, other data, and the like. A data store may comprise any storage media capable of storing data. For example, a data store may comprise a file system, volatile memory such as RAM, other storage media described in conjunction with FIG. 1, other storage, some combination of the above, and the like and may be distributed across multiple devices. The data store may be external, internal, or include components that are both internal and external to a device hosting the data warehouse 102.

Data stored in the data warehouse 102 may be organized in tables, records, objects, other data structures, and the like. The data may be stored in hyper-text markup language ("HTML") files, extensible markup language ("XML") files, spreadsheets, flat files, document files, and other types of files. The data warehouse 102 may also comprise a relational database with a normalized schema or a denormalized schema like a dimensional model viz. star schema or snow flake schema, object-oriented database, hierarchical database, network database, other type of database, some combination or extension of the above, and the like.

Data from a data warehouse 102 may be accessed via a database management system ("DBMS"). A DBMS may comprise one or more programs that control organization, storage, management, and retrieval of data of the data warehouse 102. A DBMS may receive requests to access data in the data warehouse and may perform the operations needed to provide this access. Access as used herein may include reading data, writing data, deleting data, updating data, a combination including one or more of the above, and the like.

Each of the data sources 104A-104N may be implemented on or as one or more computers and may comprise one or more processes that produce and/or provide data. For example, a data source may comprise a company database. As another example, a data source may comprise an online transaction processing ("OLTP") system.

The data warehouse 102 may be implemented on or as one or more computers. The data warehouse 102 may also include a data collector 108. The data collector 108 may work in conjunction with warehouse agents 110A-110N to collect data from the data sources 104A-104N, respectively. The warehouse agent 110 of a data source 104 may comprise a set of one or more processes, threads, or the like that provide information from the data source 104 to the data warehouse 102. A warehouse agent 110 may execute periodically, in response to changes of data in the data source 104, or in some other manner. For example, a warehouse agent 110 may be invoked from a process that updates, deletes, or adds data on a data source 104. In conjunction with updating, deleting, or adding the data, the warehouse agent 110 may send data to the data warehouse 102.

The data sources 104A-104N may include data that is structured according to a type system. A type system defines a hierarchy of data types of data in a data source 104 from which the data warehouse 102 obtains data. In a type system, a type may either be a base type or may be derived from another type or extended from another type. For example, a supervisor type may derive from an employee type, which may derive from an entity type. A supervisor type may include all the properties of an employee type and may extend these properties with additional properties. Likewise, an employee type may include all the properties of an entity type and may extend these properties. The entity type may be a base type that does not derive from another type.

Figure 2:
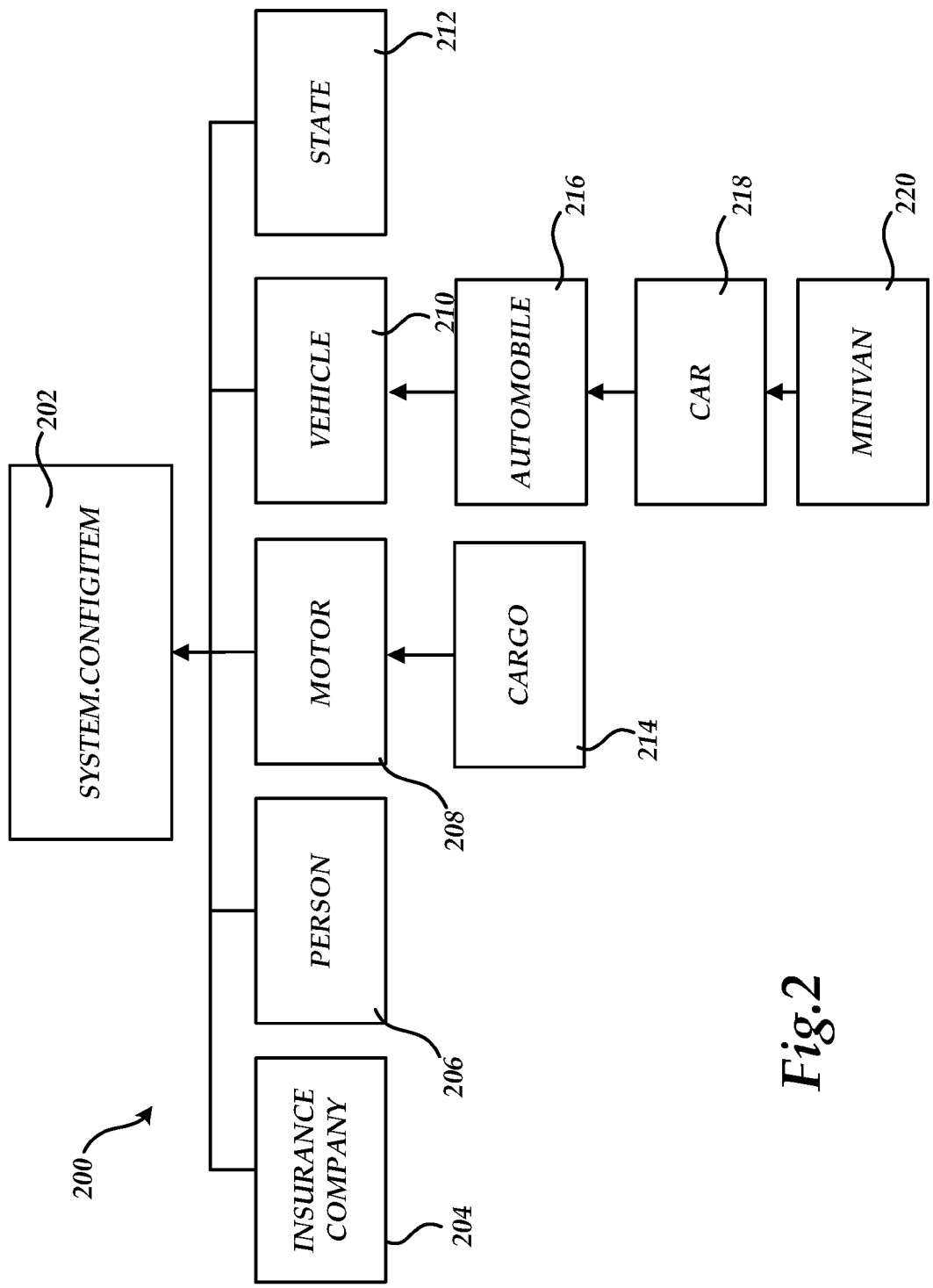
FIG. 2 is a block diagram that generally represents a portion of an exemplary type system in accordance with aspects of the subject matter described herein.

FIG. 2 is a block diagram that generally represents a portion of an exemplary type system in accordance with aspects of the subject matter described herein. The illustrative type system 200 shown in FIG. 2 includes a system.configitem type 202. An insurance company type 204, a person type 206, a motor type 208, a vehicle type 210, and a state type 212 derive from the system.configitem type 202. A cargo type 214 derives from the motor type 208. An automobile type 216, a car type 218, and a minivan type 220 derive from the vehicle type 210. The car type 218 derives from the automobile type 216 and the minivan type 220 derives from the car type 218. It should be appreciated that the type system 200 shown in FIG. 2 is merely illustrative and that other type systems may be expressed that are different and that may have significantly greater complexity than the type system shown in FIG. 2.

Figure 3:
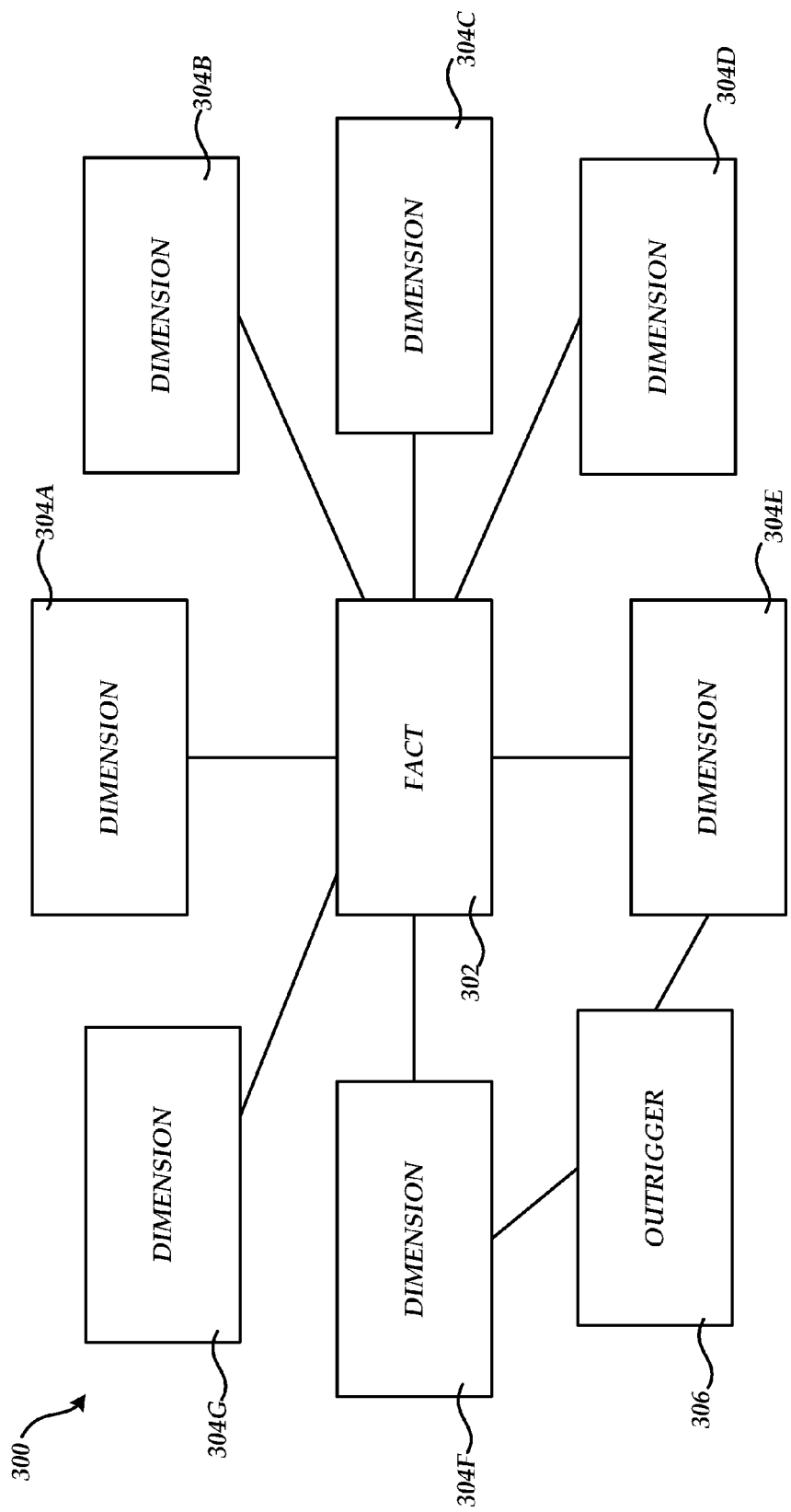
FIG. 3 is a block diagram that generally represents a data model utilized by an exemplary data warehouse in accordance with aspects of the subject matter described herein.

FIG. 3 is a block diagram that generally represents a data model utilized by an exemplary data warehouse 102 in accordance with aspects of the subject matter described herein. The data model includes a fact type 302, dimension types 304A-304G, and an outrigger type 306. These may simply be referred to as a fact, a dimension, and an outrigger, respectively.

The dimension types 304A-304G capture an aspect of an organization. Dimensions strive to include as many descriptive fields as possible. For example, an organization may have employees having various responsibilities such as engineering, accounting, management, and so forth. To capture information about employees of any responsibility, a dimension type may be created in the data warehouse 102. As another example, an organization may have products, stores, orders, and salespersons. Each of these general types may have multiple subtypes, but the organization may desire reports on the general level. To capture information from each of these types and their subtypes, if any, four dimensions types 304 may be created at the data warehouse 102.

As used herein, the term subtype is used to refer to any type that derives directly or indirectly from another type. The subtypes of a type are all types that derive directly or indirectly from the type. For instance, as described above with reference to FIG. 2, the automobile type 216 is a subtype of the vehicle type 210 and of the system.configitem type 202. Similarly, the cargo type 214 is a subtype of the motor type 208, and the system.configitem type 202. Furthermore, the subtypes of the automobile type 204 are the types 218-220.

A fact type 302 associates and hence tracks changes with respect to each dimension types 304 to one another. A fact type 302 may be used to create a fact table where each row of the fact table associates corresponding rows of dimension tables. For example, a fact table may include keys that may be used to reference specific rows of the dimension tables defined according to the dimension types 304A-304G. As an example, a row of a fact table may include keys of a salesperson, a store, a customer, and a product. The salesperson may be an employee of the store and may have sold the customer the product. Information about the salesperson, store, customer, and product may be stored in various dimension tables.

A fact may include zero or more measures. A measure may include additional information about data stored in the one or more dimensions associated by the fact. For example, a measure may include quantity of a product sold in a transaction, central processing unit ("CPU") or other utilization of a computer, number of software products installed on a computer, price, another measure, or the like.

An outrigger (e.g., an outrigger defined according to the outrigger type 306) associates properties of one or more types (e.g., types associated with the dimension types 304E and 304F). For example, one type may include computer information. Computers may be manufactured by various manufacturers. Another type may include printer information. Various manufacturers, also, may manufacture printers. Instead of storing the manufacturers in the dimension tables, manufacturer identifiers ("IDs") may be stored in the dimension tables. These manufacturer IDs may also be stored in an outrigger table in tuples. Each tuple may include the manufacturer ID and a manufacturer name.

An outrigger table like the one described above may speed and/or simplify obtaining information about manufacturers. For example, without the outrigger table, determining the distinct manufacturers may involve scanning each dimension table with a potentially very large number of dimension members that includes manufacturer information, concatenating the manufacturers found, and eliminating duplicates. With the outrigger table, determining the distinct manufacturers may involve just scanning the outrigger table to locate the distinct entry for each manufacturer.

Figure 4:
FIG. 4 is a block diagram that illustrates aspects of a mapping that associates elements of a type system utilized by a data source with a model used by a data warehouse in accordance with aspects of the subject matter described herein.

FIG. 4 is a block diagram that illustrates aspects of a mapping 402 that associates elements of a type system 200 utilized by a data source 104 with a model 406 used by a data warehouse 102 in accordance with aspects of the subject matter described herein. The mapping 402 defines associations between types of the data source type system 200 and elements of the data warehouse model 406, namely dimensions, relationship facts, and outriggers.

Via the mapping 402, a dimension may be associated one-to-one with a type at any level in the type system 200. For example, referring back to FIG. 2, a dimension may be associated with the vehicle type 210, the state type 212, or with any of the other types shown in the type system 200. The mapping may indicate whether all subtypes of a type are to be mapped to the same dimension. The mapping 402 may also indicate whether all properties in all subtypes of a mapped type are to be included in the dimension automatically as and when the subtypes are introduced in the system Prior to generating the mapping, the type system 200 utilized by the data source 104 is described. In one example, the type system 200 of FIG. 2 is described by way of the illustrative XML shown in APPENDIX I, below. In the exemplary XML shown in APPENDIX I, the types 202-220 have been defined and properties have been specified for each of the types 202-220. It should be appreciated that the properties indicated in APPENDIX I are exemplary and are not intended to be all-inclusive or exhaustive. Other properties may be defined in an actual type system. Furthermore, the form of the definition of the type system is not limited to XML. For example, the definition may be included in a class hierarchy defined in a language other than XML. Indeed virtually any type definition language or structured storage for the type system 200 and the mapping may be used without departing from the spirit or scope of aspects of the subject matter described herein. Based on the XML structure indicated in APPENDIX I, and the teachings presented herein, those skilled in the art will recognize many different type definition languages that may be used to define a type system 200 of a data source 104 without departing from the spirit or scope of aspects of the subject matter described herein.

In the exemplary XML shown in APPENDIX I, three relationships are also defined: AutomobileRegisterinState; AutomobileInsuredByCompany; and AutomobileOwnedByPerson. The relationship type AutomobileRegisterinState associates an automobile with the state that it is registered in, the relationship type AutomobileInsuredByCompany associates an automobile by the insurance company used to insure it, and AutomobileOwnedByPerson associates an automobile with the name of its owner. As will be discussed in greater detail below, a fact may be defined that is used to capture one or more of these relationships. Similarly, multiple types and relationships between those types may be defined. These relationships may then be used to create a fact that associates multiple dimensions in a data warehouse 102 that are mapped to the types in the data source 104. Additional details regarding this process will be provided below. An enumeration is also defined in the XML set forth in APPENDIX I.

Once the type system 200 has been defined, a mapping 402 can be created between the type system 200 utilized by the data source 104 and the data warehouse model 406. Via the mapping 402, a relationship fact in the data warehouse 102 may be associated with a set of one or more types in the type system 200 through the relationship types that relate these types. Associating a relationship fact with a type allows a fact table to be built which associates multiple dimensions in the data warehouse 102. Exemplary XML that may be used to define several exemplary relationship facts is shown in APPENDIX II.

An outrigger may also be associated with properties of one or more types via the mapping 402. The outrigger may then track these properties across the one or more types. For instance, in the exemplary XML shown in APPENDIX II, an outrigger is defined that associates the "Maker" and "Motormaker" properties in the automobile type 216 and the motor type 208. Several other outriggers are also defined in the example XML. Outriggers may additionally be defined for a property of a certain type or for a set of similar properties from more than one type.

Dimensions may also be defined via the mapping 402. As also described briefly above, the mapping 402 may contain data that defines which properties are processed for each dimension in the generated transform. In particular, in one embodiment each dimension includes an XML attribute named "HierarchyHint." The HierarchyHint attribute specifies which properties are processed for the associated dimension in the generated transform.

In one implementation, the HierarchyHint attribute may be defined as "Exact," "IncludeExtendedClassProperties," or "IncludeDerivedClassProperties." When the HierarchyHint attribute is defined as Exact for a dimension, only those properties specified in the mapping 402 will be processed for the dimension, even if other properties are present. When the HierarchyHint attribute is defined as IncludeExtendedClassProperties for a dimension, new properties added to a type when the type or any of its parent types are extended will also be processed. When the HierarchyHint attribute is defined as IncludeDerivedClassProperties, the properties for the target class and its derived types will be processed and hence included in the table and also the transform code. An exclusion list of attributes may also be specified that will cause the specified attributes not to be processed. Additional details regarding the use of the HierarchyHint attribute in processing the properties for a dimension will be provided below.

It should be appreciated that the definitions for the dimensions, facts, and outriggers shown in APPENDIX II may include more, fewer, and/or other types, properties, relationships, associations, and so forth without departing from the spirit or scope of aspects of the subject matter described herein. Furthermore, the form of the definitions for the facts, dimensions, and outriggers is not limited to XML. For example, the definition may be included in a class hierarchy defined in a language other than XML. Indeed, virtually any type definition language for the type system may be used without departing from the spirit or scope of aspects of the subject matter described herein. Based on the structure indicate above and the teachings herein, those skilled in the art may recognize many different type definition languages that may be used to define relationship facts, dimensions, and outriggers without departing from the spirit or scope of aspects of the subject matter described herein.

It should also be appreciated that, as used herein, the phrase "mapping information" refers to information in the mapping 402, data source type system 200, and/or data warehouse model 406. One or more components may utilize the mapping information to extract, transform, and load data. These components may create and maintain a data warehouse 102 modeled according to the data warehouse model 406 based on a data source 104 structured according to the data source type system 200. In particular, where the mapping 402 indicates that a type is associated with a dimension, a component may generate a storage element (e.g., a table) of the dimension such that the storage element has fields (e.g., columns) corresponding to the properties included in the type. If the type has subtypes, the component may add any additional properties included in the subtypes to the dimension if the mapping 402 indicates that this is to be done.

If the type system 200 is updated, a component may update (e.g., keep in sync) the storage element of the dimension in the data warehouse 102 as appropriate. For example, if the mapping 402 indicates that subtypes are to be mapped to a dimension and that all properties are to be included, when a subtype of a mapped type is added to the type system 200, the dimension may be updated to include fields corresponding to properties of the subtype. Likewise, if a subtype of a mapped type is deleted, the dimension may be updated to remove fields for properties in the deleted subtype.

For extraction, a component may determine what data to extract from a data source based on the mapping information 402. For example, if the mapping 402 associates a type with a dimension and indicates that subtypes are not to be associated with the dimension, the component may extract data associated with the type but not extract data associated with subtypes of the type. Likewise, for loading, a component may determine what data to load into the data warehouse 102 based on the mapping information 402.

When the mapping 402 changes, the components identified above may operate to handle these changes. In one embodiment, a component may create code that does the work desired. For example, a component responsible for extracting data from a data source 104 may generate code to extract the data from the data source 104. This code may remain until the component generates different code to extract the data.

As another example, a component responsible for maintaining a schema (e.g., table definitions) of a data warehouse 102 may generate code that maintains the schema. When the component determines that the schema of the data warehouse 102 is to be changed based on the mapping information, the component may replace the previously generated code with other code. In another embodiment, the component itself may perform the work desired. For example, a component responsible for extracting data from a data source may change what data it extracts based on the mapping information. In this embodiment, the component may "interpret" the mapping information to determine how to extract data from a data source 104.

Figure 5:
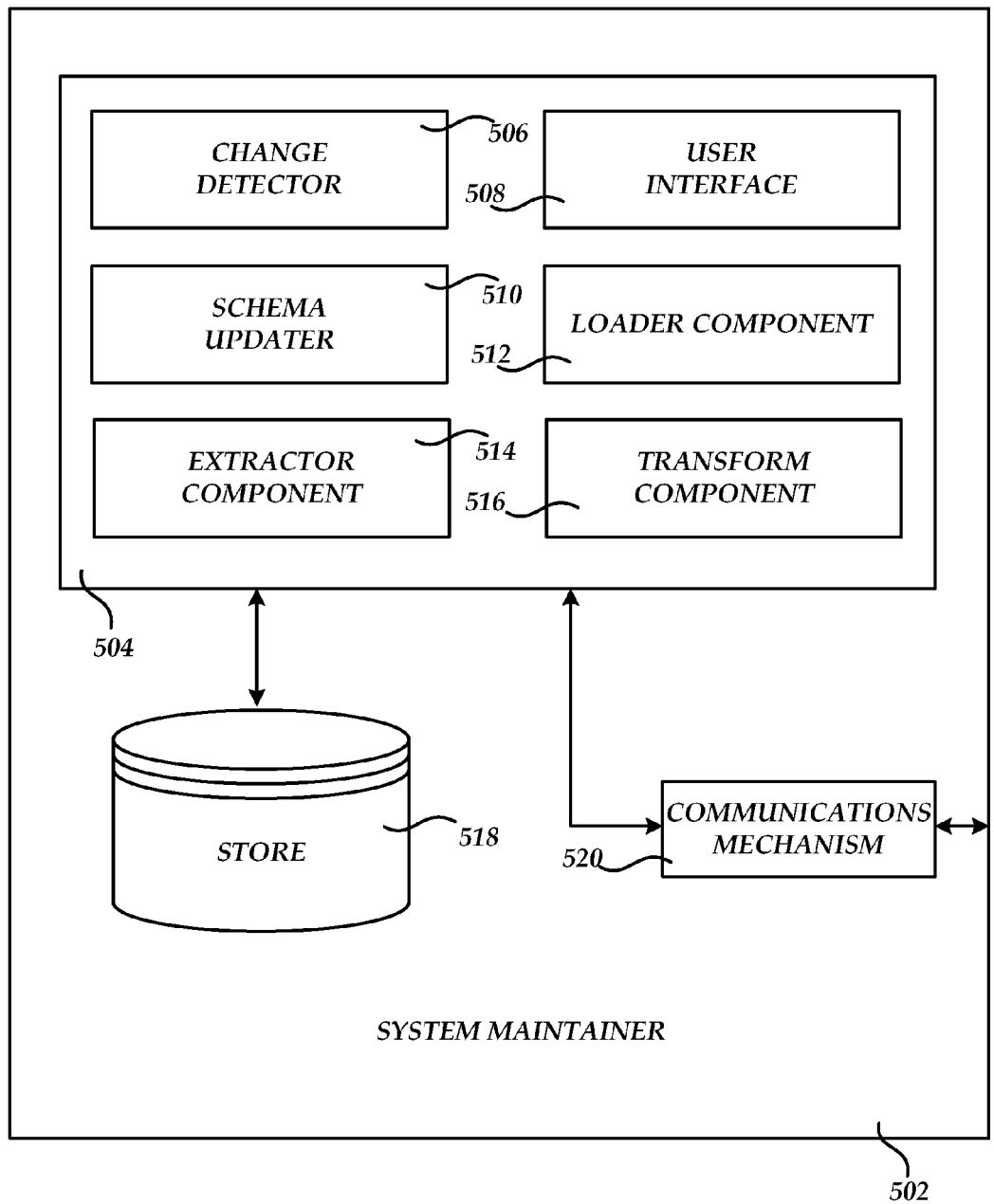
FIG. 5 is a block diagram that illustrates aspects of various components of an exemplary system configured to implement the subject matter described herein.

FIG. 5 is a block diagram that illustrates aspects of various components of an exemplary system configured to implement the subject matter described herein. The components illustrated in FIG. 5 are exemplary and are not meant to be all-inclusive of components that may be needed or included. In other embodiments, the components and/or functions described in conjunction with FIG. 5 may be included in other components (shown or not shown) or placed in subcomponents without departing from the spirit or scope of aspects of the subject matter described herein. In some embodiments, the components and/or functions described in conjunction with FIG. 5 may be distributed across multiple devices (e.g., the devices illustrated in FIG. 5).

The system maintainer 502 shown in FIG. 5 may include data components 504, a store 518, and a communications mechanism 520. The data components 504 may include a change detector 506, a schema updater 510, an extractor component 514, a user interface 508, a loader component 512, and a transform component 516. Each of these components is described in detail below.

The communications mechanism 520 allows apparatuses upon which the system maintainer 502 is hosted to communicate with other entities as shown in FIG. 1 and described above. The communications mechanism 520 may be a network interface or adapter, modem, or any other mechanism for establishing network communications.

The store 518 is any storage media capable of storing mapping information. The store 518 may comprise a file system, database, volatile memory such as a random access memory ("RAM"), other storage, some combination of the above, and the like and may be distributed across multiple devices. The store 518 may be external, internal, or include components that are both internal and external to the apparatus or apparatuses hosting the system maintainer 502.

The change detector 506 comprises one or more processes, threads, or the like that are responsible for detecting changes to a data type and/or data on a data source 104. In response to a change to a data type, the change detector 506 may determine if the change affects data stored in the data warehouse 102. A change may affect the data warehouse 102 if, for example, the change modifies a type or a subtype that is mapped to a dimension, fact, or outrigger. If a change affects the data warehouse 102, the change detector 506 may trigger the schema updater 510, the extractor component 514, the transform component 516, and the loader component 512.

The schema updater 510 may comprise an executable software component that is responsible for updating and/or creating the schema of a data warehouse 102 based on mapping information. For example, the mapping information may indicate types that are associated with dimensions. Using this information, the schema updater 510 may create dimensions having fields (e.g., columns) suitable for storing information from a data source 104 structured according to the types.

The extractor component 514 may comprise an executable software component that is responsible for extracting data from a data source 104 and providing that data to the transform component 516 or the loader component 512. The extractor component 514 may utilize the mapping information to determine the data that needs to be extracted from a data source 104. Using the mapping information, the extractor component 514 may generate code that extracts the data from the data source.

The loader component 512 may comprise a component that is responsible for loading transformed data into the data marts 102. The loader component 512 may utilize the mapping information to determine the data that needs to be loaded into the data marts 102. Using the mapping information, the loader component 512 may generate code that loads the data into the data warehouse 102.

The transform component 516 takes the data extracted from the data source 104 by the extractor component 514 and generates code for transforming the data. In particular, the transform component 516 utilizes the mapping information to generate program code for transforming the data extracted from the data source 104 into a format compatible with the data warehouse 102. Following execution of the code generated by the transform component 516, the loader component 512 loads the transformed data into the data warehouse 102. Additional details regarding the operation of the transform component 516 will be provided below with reference to FIGS. 8-11.

The user interface 508 may comprise a component that provides an appropriate user interface to a system administrator or the like to obtain the mapping information. For example, the user interface may 508 may provide a graphical user interface through which an administrator may enter associations between elements of a data warehouse 102 (e.g., dimensions, facts, and outriggers) and types of a type system 200. The user interface 508 may also provide other functionality.

Figure 6:
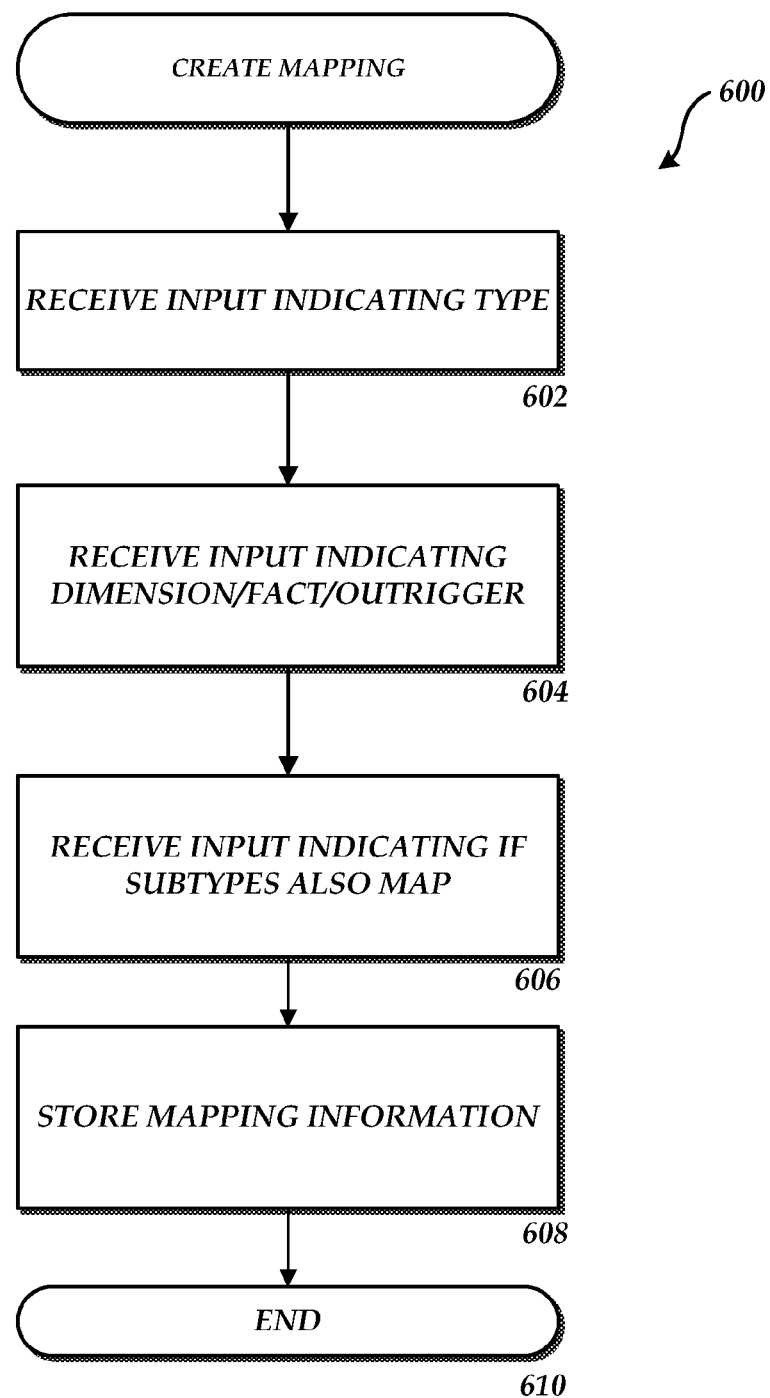
FIG. 6 is a flow diagram showing a routine that illustrates exemplary actions that may be performed to receive and create mapping information in according with aspects of the subject matter described herein.

Referring now to FIG. 6, additional details will be provided regarding the embodiments presented herein for auto-generation of code to perform a transform in an ETL process. In particular, FIG. 6 is a flow diagram showing a routine 600 that generally illustrates exemplary actions that may be performed to receive and create mapping information in according with aspects of the subject matter described herein. It should be appreciated that the logical operations described herein with respect to FIG. 6 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 602, where first input is received that indicates a type of a type system 200. For example, the user interface 508 may receive input that defines a type system 200. As another example, a type system 200 may be indicated via an XML or other file, such as that set forth in APPENDIX I. From operation 602, the routine 600 proceeds to operation 604.

At operation 604, second input is received that indicates an element (e.g., dimension, fact, outrigger) of a data warehouse to associate with the type. For example, the user interface 508 may receive input that indicates an element to associate with the type. As another example, this may be indicated via an XML or other file, such as that set forth in APPENDIX II. From operation 604, the routine 600 proceeds to operation 606.

At operation 606, third input is received that indicates whether subtypes are also to map to the element. For example, the user interface 508 may receive an indication (e.g., a check box) that indicates whether subtypes are also to map to the element. As another example, this may also be indicated via an XML or other file, such as that set forth in APPENDIX II. Once the mapping information has been received, as described above, the routine 600 proceeds to operation 608 where the mapping information is stored. For instance, the mapping information may be stored in the store 518. The routine 600 then proceeds to operation 610, where it ends.

Figure 7:
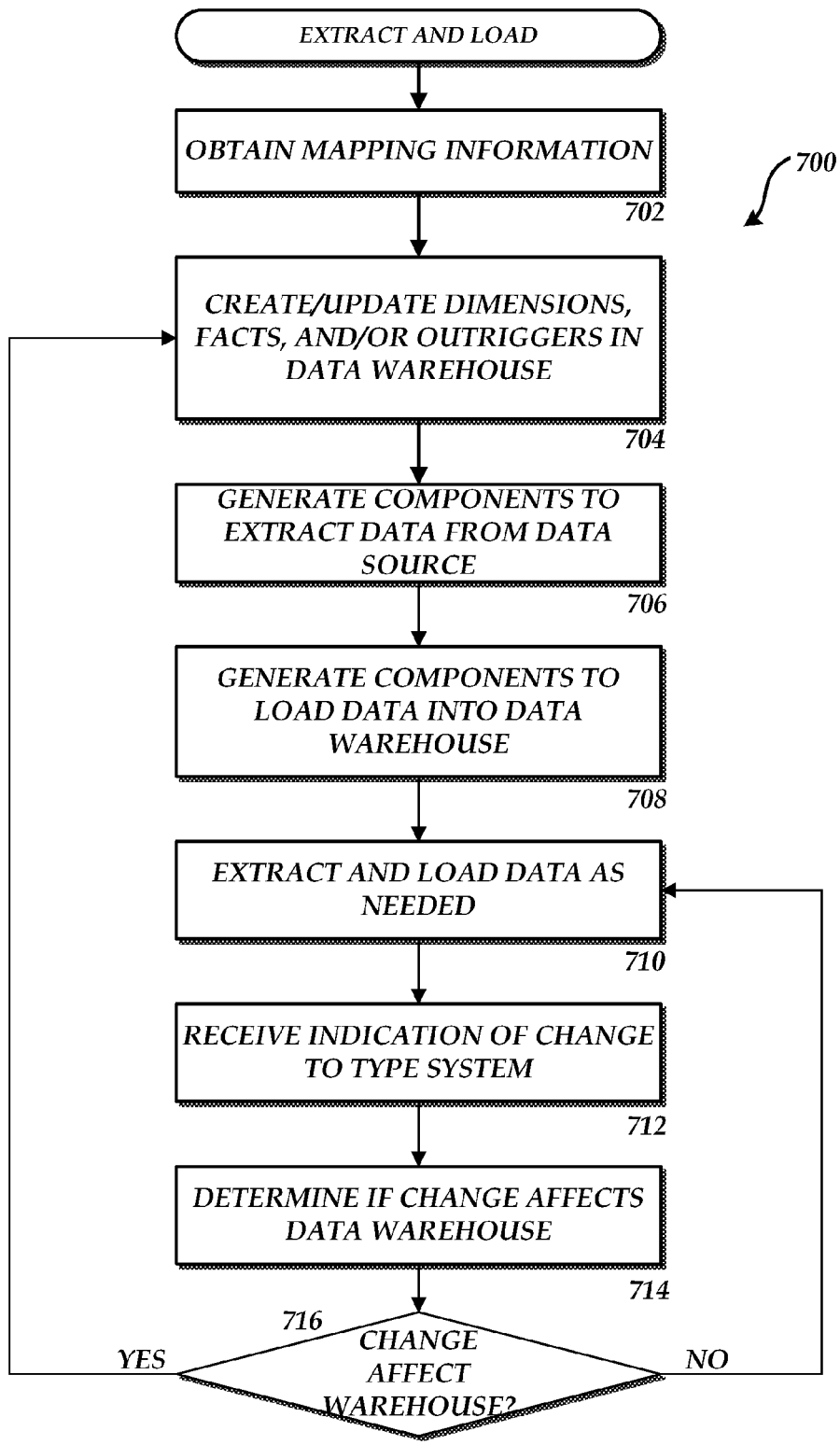
FIG. 7 is a flow diagram showing a routine that illustrates exemplary actions that may be performed to obtain data from various data sources in accordance with aspects of the subject matter described herein.

Referring now to FIG. 7, a routine 700 will be described that illustrates exemplary actions that may occur to obtain data from various data sources in accordance with aspects of the subject matter described herein. The routine 700 begins at operation 702 where the mapping information is obtained. For example, the schema updater 510 may obtain mapping information described above with reference to FIG. 4. As discussed above, the mapping information may define a type system, elements of a data warehouse model (e.g., dimensions, facts, and outriggers), and a mapping between types in the type system and elements of the warehouse model. From operation 702, the routine 700 proceeds to operation 704.

At operation 704, elements of the data warehouse model such as dimensions, facts, and outriggers are created and/or updated. For example, referring the schema updater 510 may use mapping information to generate tables corresponding to dimensions, facts, and outriggers. From operation 704, the routine 700 proceeds to operation 706, where components to extract data from the data source 104 are generated. For example, the extractor component 5143 may generate executable program code to extract data identified by the mapping information to be loaded into the data warehouse 102. From operation 706, the routine 700 proceeds to operation 708.

At operation 708, components to load data into the data warehouse are generated. For example, as discussed above, the loader component 512 may generate code to load data into the data warehouse 102. This code may be generated using the mapping information in the manner described above. From operation 708, the routine 700 proceeds to operation 710, where data is extracted and loaded as needed. For example, the warehouse agents 110A-110N may extract data from their respective data sources 104A-104N while the data collector 108 may load this data into the data warehouse 102. From operation 710, the routine 700 proceeds to operation 712.

At operation 712, an indication that the type system has changed is received. For example, the change detector 506 may detect (e.g., by actively looking or being informed) that a change has occurred to a type system. In response to such an indication, the routine 700 proceeds to operation 714 where a determination is made as to whether the change affects the data warehouse 102. If the change affects the data warehouse 102, then the routine 700 proceeds to operation 704, where the elements of the data warehouse 102 may be updated in the manner described above to accommodate the change. If the change does not affect the data warehouse, the routine 700 proceeds to operation 710, where the above-described process of extracting and loading data continues. Additional details regarding the mapping information, the extraction process, and the loading process described above may be found in U.S. patent application Ser. No. 12/129,667, filed on May 29, 2008, and entitled "Model Based Data Warehousing and Analytics," which is assigned to the assignee of the instant patent application and expressly incorporated by reference herein in its entirety.

Figure 8:
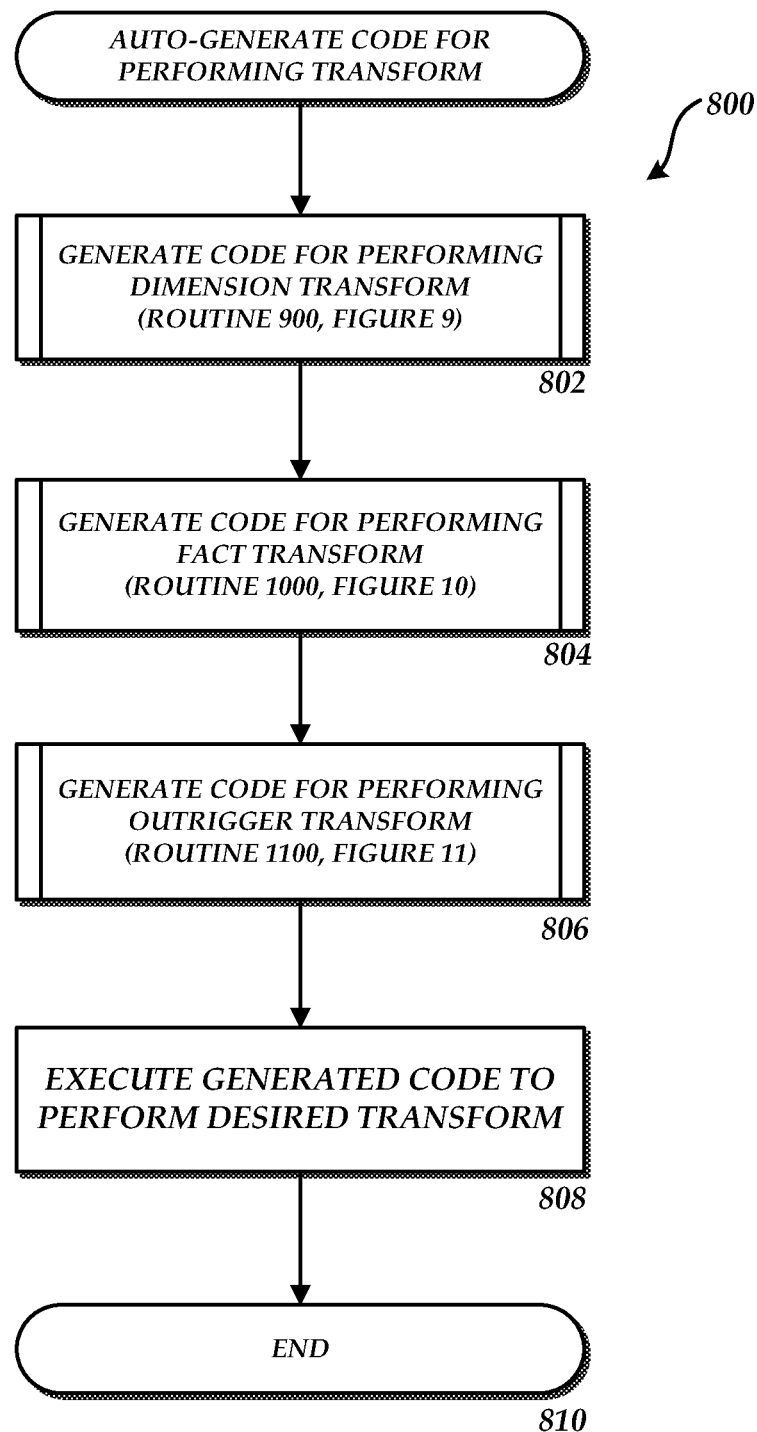
FIG. 8 is a flow diagram showing a routine that illustrates exemplary actions that may be performed to auto-generate program code for performing a transform in an ETL process in one embodiment presented herein.

Turning now to FIG. 8, additional details regarding one process presented herein for auto-generating program code for performing a transform in an ETL process will be described. In particular, FIG. 8 shows an illustrative routine 800 that illustrates aspects of the operation of the transform component 516. As discussed briefly above, the transform component 516 is an executable software component configured to take the data extracted from the data source 104 by the extractor component 514 and to generate executable program code for transforming the data. In particular, the transform component 516 utilizes the mapping information to generate program code for transforming the data extracted from the data source 104 into a format compatible with the data warehouse 102. Following execution of the code generated by the transform component 516, the loader component 512 loads the transformed data into the data warehouse 102. In one embodiment, the executable program code generated by the transform component 516 comprises structured query language ("SQL") script. It should be appreciated, however, that other types of executable program code might be generated for performing the desired transform. For example, other procedural languages like C#, C++ or JAVA, and/or other commercial ETL tools such as SQL Server Integration Services could be used to generate a customized transform code to perform the transformation The routine 800 begins at operation 802, where program code is generated for performing a dimension transform using the mapping 402. Additional details regarding one illustrative process presented herein for generating program code for performing a dimension transform using the mapping 402 will be provided below with respect to FIG. 9. Once the program code for performing the dimension transform has been generated, the routine 800 proceeds to operation 804.

At operation 804, program code is generated for performing a fact transform using the mapping 402. Additional details regarding one illustrative process presented herein for generating program code for performing a act transform using the mapping 402 will be provided below with respect to FIG. 10. Once the program code for performing the act transform has been generated, the routine 800 proceeds to operation 806.

At operation 806, program code is generated for performing an outrigger transform using the mapping 402. Additional details regarding one illustrative process presented herein for generating program code for performing an outrigger transform using the mapping 402 will be provided below with respect to FIG. 11. Once the program code for performing the dimension transform has been generated, the routine 800 proceeds to operation 808.

At operation 808, the program code generated at operations 802, 804, and 806 is executed to thereby perform the desired transform. As discussed above, once the transform has been completed, the loader component 512 loads the transformed data into the data warehouse 102. From operation 808, the routine 800 proceeds to operation 810, where it ends.

Figure 9:
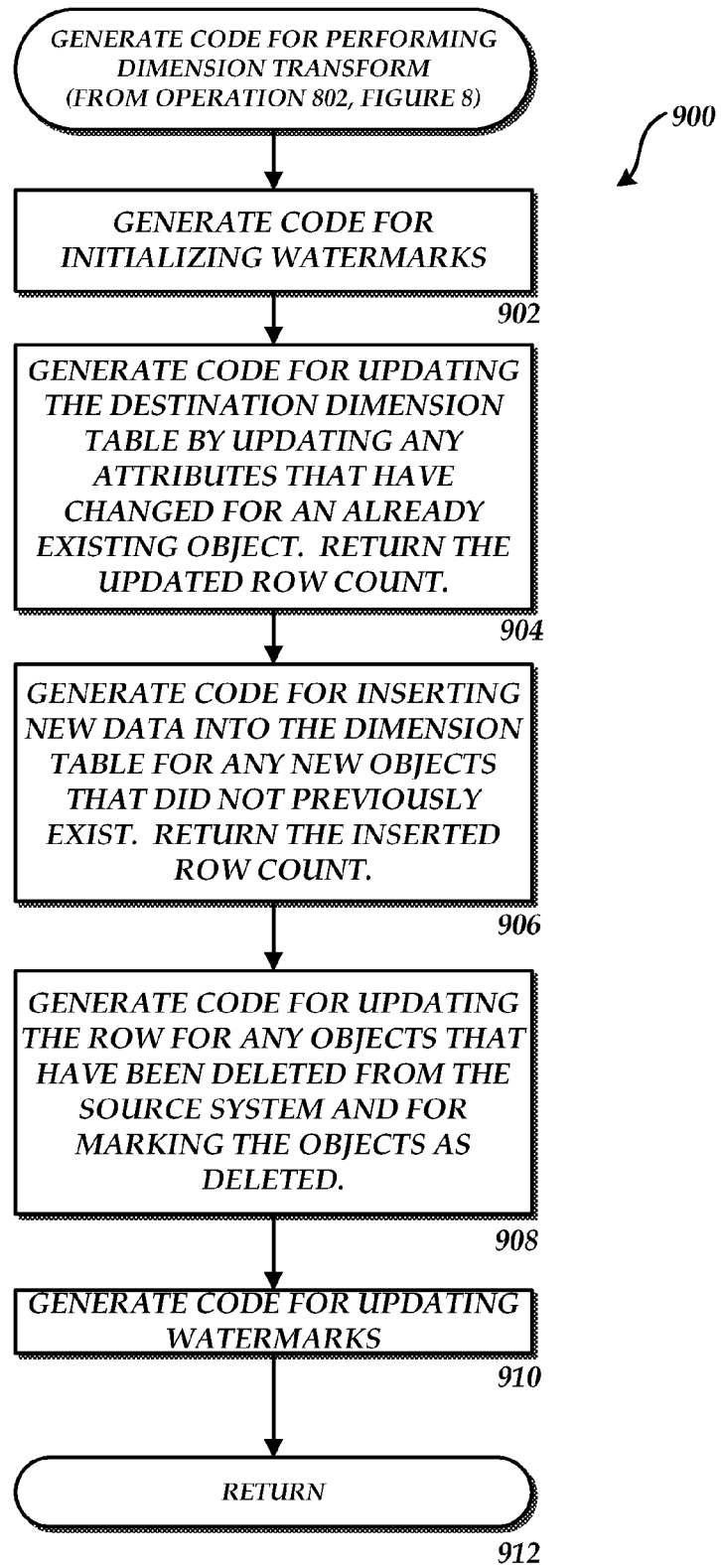
FIG. 9 is a flow diagram showing a routine that illustrates exemplary actions that may be performed to auto-generate program code for performing a dimension transform according to one embodiment presented herein.

Referring now to FIG. 9, a routine 900 illustrating aspects of the operation of the transform component 516 for generating code for performing a dimension transform using the mapping 402 will be described. The routine 900 begins at operation 902, where program code for initializing several watermarks is generated. The watermarks are variables that indicate the date and time at which a previous dimension transform ended. Through the use of the watermarks, a determination can be made as to where the current dimension transform is to begin. Once the program code for initializing the watermarks has been generated, the routine 900 proceeds from operation 902 to operation 904.

As discussed above, the HierarchyHint attribute defined in the mapping 402 may be utilized to identify the attributes that are to be processed for each dimension. Once the attributes have been identified, program code is generated at operation 904 for updating the destination dimension by updating any attributes that have changed for an already existing member in the dimension. For instance, if an already existing attribute has changed since the last transform, it will be updated by this operation. Program code is also generated for returning the updated row count. From operation 904, the routine 900 proceeds to operation 906, where program code is generated for inserting new data into the dimension table in the data warehouse 402 for any new objects. Program code is also generated for returning an inserted row count. From operation 906, the routine 900 proceeds to operation 908.

At operation 908, program code is generated for updating a row for any instances that have been deleted from the source system. In order to perform this process, the data is not deleted from the data warehouse 102. Rather, the data is marked as deleted and a deleted data is recorded. In this manner, temporal information can be stored. From operation 908, the routine 900 proceeds to operation 910, where program code is generated for updating the watermarks so that the next instance of the transform code will start where the latest time that was processed in the current batch. It should be appreciated that illustrative program code generated for performing a dimension transform is shown in APPENDIX III, below. From operation 910, the routine 900 proceeds to operation 912 where it returns to operation 804, described above.

Figure 10:
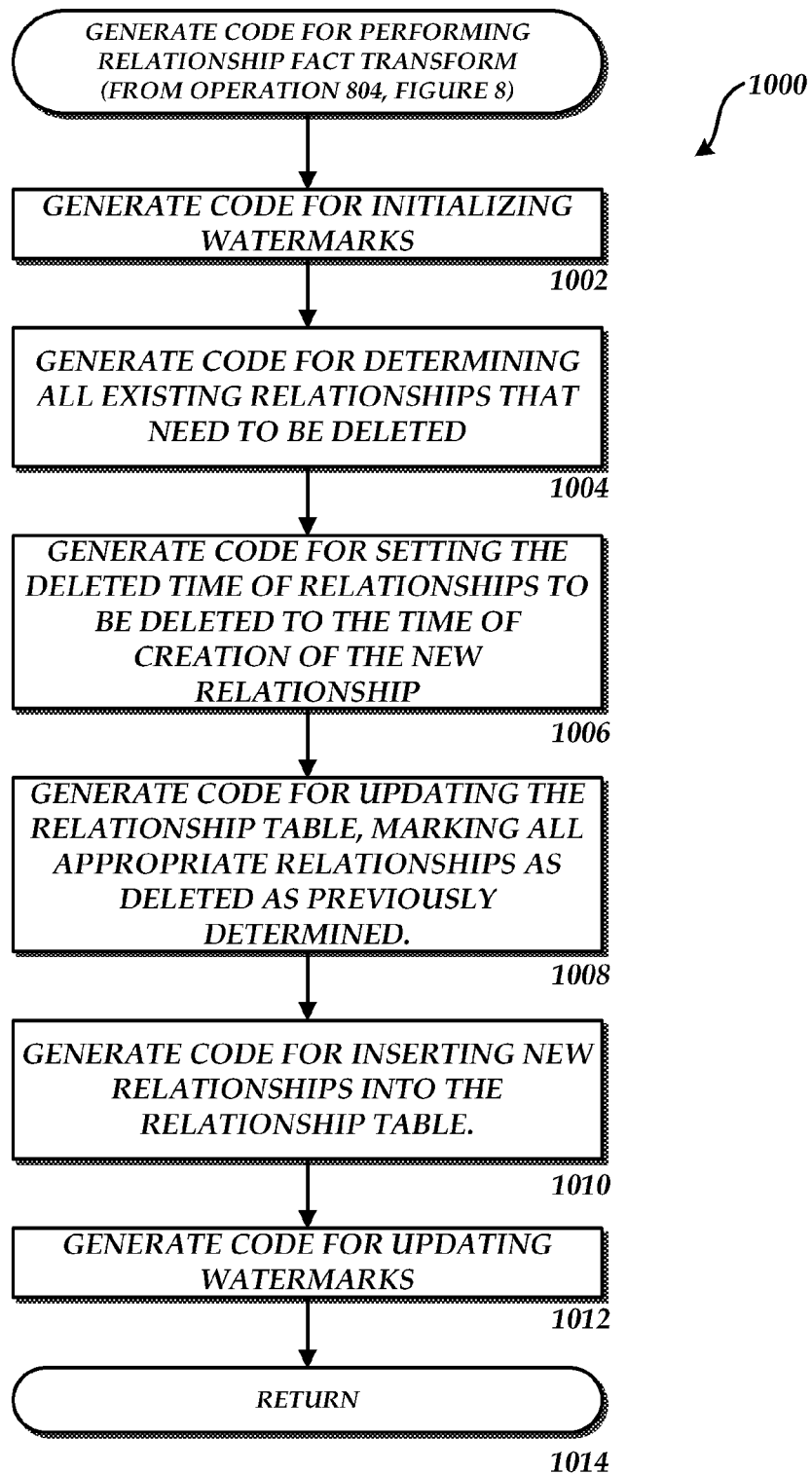
FIG. 10 is a flow diagram showing a routine that illustrates exemplary actions that may be performed to auto-generate program code for performing a relationship fact transform according to one embodiment presented herein.

Turning now to FIG. 10, a routine 1000 illustrating aspects of the operation of the transform component 516 for generating code for performing a relationship fact transform will be described. The routine 1000 begins at operation 1002, where the watermarks are initialized. Once the watermarks have been initialized, the routine 1000 proceeds to operation 1004 where program code is generated for determining the existing relationships that need to be deleted. If a relationship has already been transformed, but the relationship has been modified, the original relationship needs to be deleted. Once program code for determining the existing relationships that need to be deleted has been generated, the routine 1000 proceeds to operation 1006.

At operation 1006, program code is generated for setting the deleted time of relationships to be deleted to the time of creation of the new relationship.

Once this program code has been generated, the routine 1000 proceeds to operation 1008, where program code is generated for updating the relationship table in the data warehouse 102 and marking all appropriate relationships as deleted as previously determined. Program code for returning an updated count is also generated.

From operation 1010, the routine 1000 proceeds to operation 1010, where program code for inserting new relationships into the relationship table in the data warehouse 102 is generated. The routine 1000 then proceeds to operation 1012, where program code for updating the watermarks and any timestamps so that the next transform will start at the appropriate time is generated. It should be appreciated that illustrative program code generated for performing a relationship transform is shown in APPENDIX IV, below. From operation 1012, the routine 1000 proceeds to operation 1014 where it returns to operation 806, described above.

Figure 11:
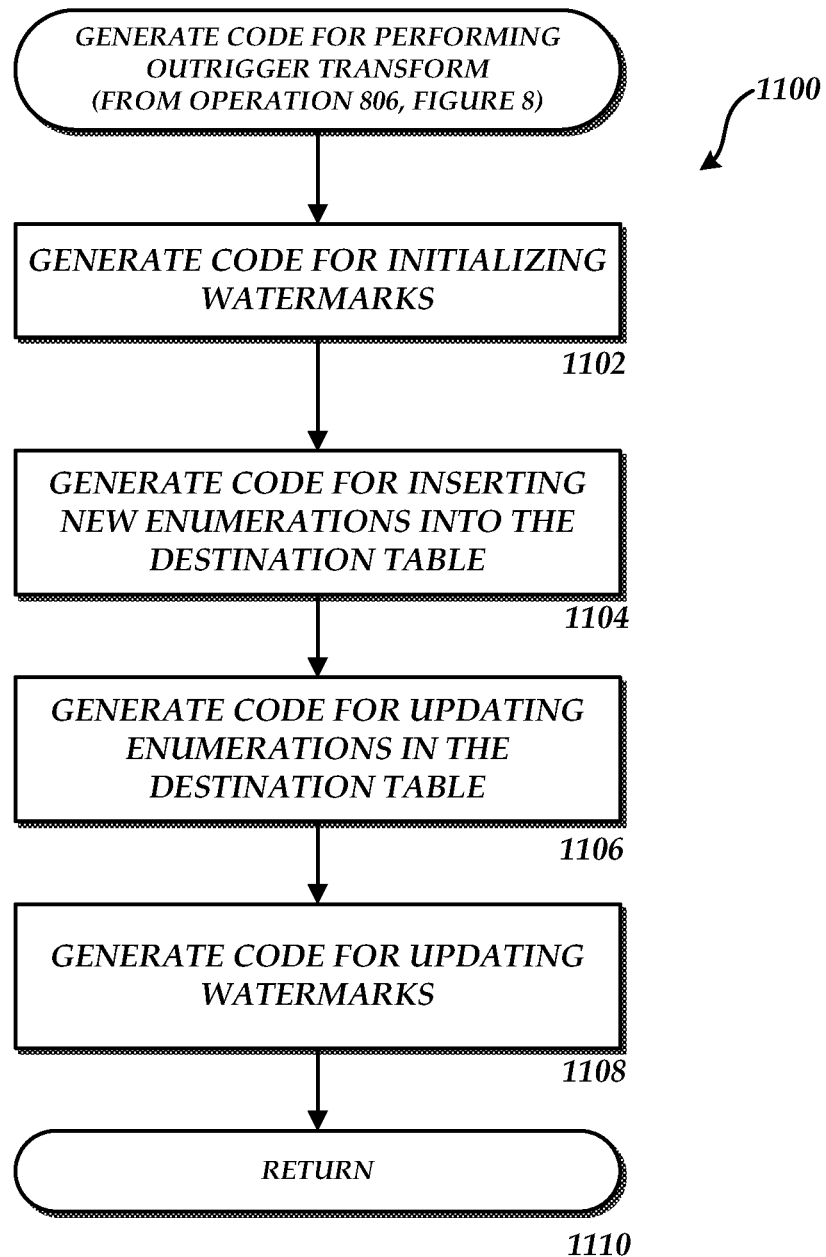
FIG. 11 is a flow diagram showing a routine that illustrates exemplary actions that may be performed to auto-generate program code for performing an outrigger transform according to one embodiment presented herein.

Referring now to FIG. 11, a routine 1100 illustrating aspects of the operation of the transform component 516 for generating code for performing an outrigger transform will be described. The routine 1100 begins at operation 1102, where the watermarks are initialized. The routine 1100 then proceeds to operation 1104, where program code is generated for inserting new enumerations into the destination table in the data warehouse 102. From operation 1104, the routine 1100 proceeds to operation 1106, where program code is generated for updating enumerations in the destination table. The routine 1100 then proceeds to operation 1108, where program code for updating the watermarks and any timestamps so that the next transform will start at the appropriate time is generated. It should be appreciated that illustrative program code generated for performing an outrigger transform is shown in APPENDIX V, below. From operation 1108, the routine 1100 proceeds to operation 1110 where it returns to operation 808, described above.

Figure 12:
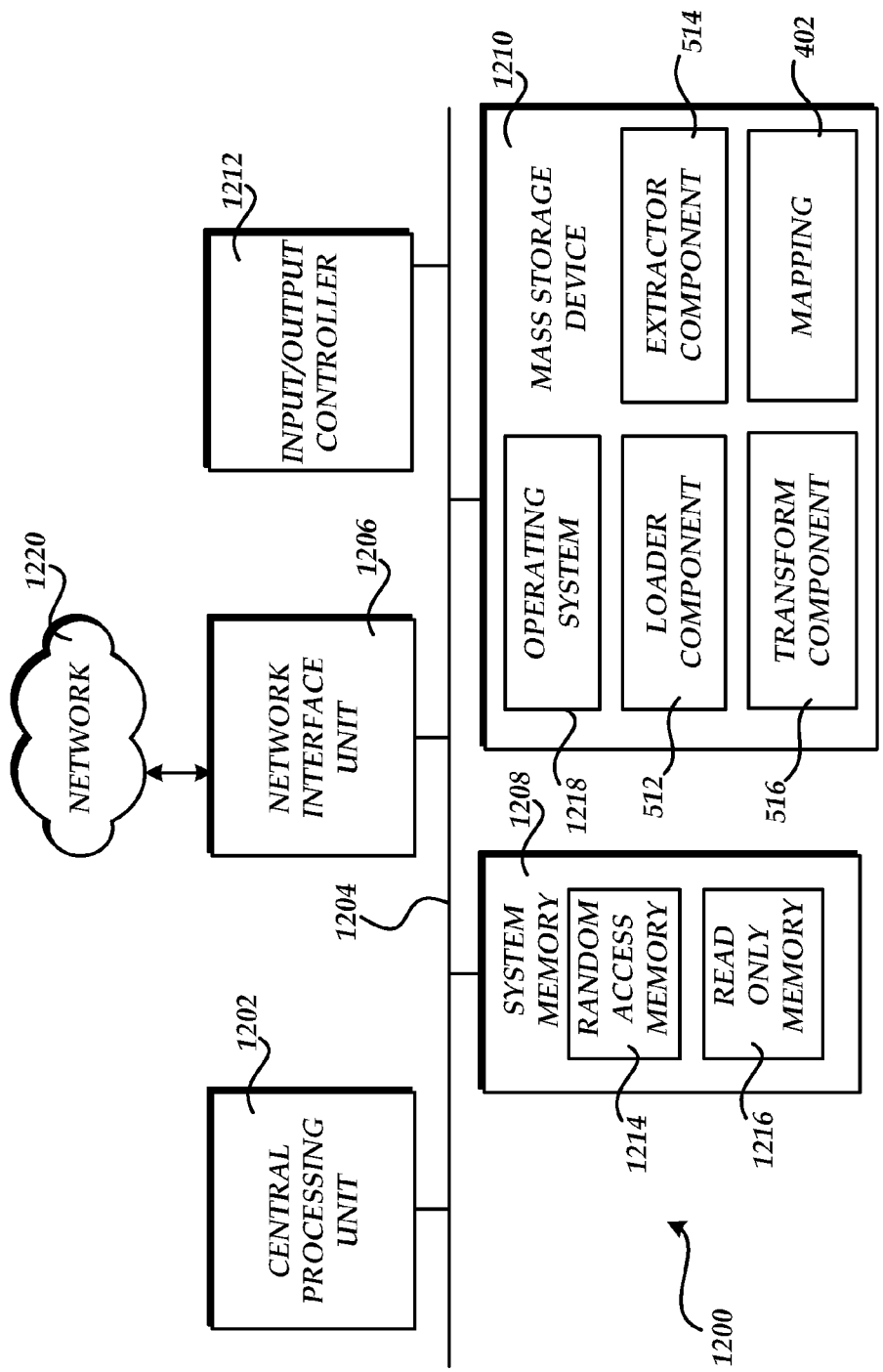
FIG. 12 is a computer architecture diagram showing an illustrative computer hardware and software architecture for a computing system capable of implementing aspects of the embodiments presented herein.

FIG. 12 shows an illustrative computer architecture for a computer 1200 capable of executing the software components described herein for auto-generation of code capable of performing a transform in an ETL process in the manner presented above. The computer architecture shown in FIG. 12 illustrates a conventional desktop, laptop, or server computer and may be utilized to execute any aspects of the software components presented herein.

The computer architecture shown in FIG. 12 includes a central processing unit 1202 ("CPU"), a system memory 1208, including a random access memory 1214 ("RAM") and a read-only memory ("ROM") 1216, and a system bus 1204 that couples the memory to the CPU 1202. A basic input/output system containing the basic routines that help to transfer information between elements within the computer 1200, such as during startup, is stored in the ROM 1216. The computer 1200 further includes a mass storage device 1210 for storing an operating system 1218, application programs, and other program modules, which are described in greater detail herein.

The mass storage device 1210 is connected to the CPU 1202 through a mass storage controller (not shown) connected to the bus 1204. The mass storage device 1210 and its associated computer-readable media provide non-volatile storage for the computer 1200. Although the description of computer-readable media contained herein refers to a mass storage device, such as a hard disk or CD-ROM drive, it should be appreciated by those skilled in the art that computer-readable media can be any available computer storage media that can be accessed by the computer 1200.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 1200.

According to various embodiments, the computer 1200 may operate in a networked environment using logical connections to remote computers through a network such as the network 1220. The computer 1200 may connect to the network 1220 through a network interface unit 1206 connected to the bus 1204. It should be appreciated that the network interface unit 1206 may also be utilized to connect to other types of networks and remote computer systems. The computer 1200 may also include an input/output controller 1212 for receiving and processing input from a number of other devices, including a keyboard, mouse, or electronic stylus (not shown in FIG. 12). Similarly, an input/output controller may provide output to a display screen, a printer, or other type of output device (also not shown in FIG. 12).

As mentioned briefly above, a number of program modules and data files may be stored in the mass storage device 1210 and RAM 1214 of the computer 1200, including an operating system 1218 suitable for controlling the operation of a networked desktop, laptop, or server computer. The mass storage device 1210 and RAM 1214 may also store one or more program modules. In particular, the mass storage device 1210 and the RAM 1214 may store the loader component 512, the extractor component 514, and the transform component 516, each of which was described in detail above with respect to FIGS. 1-11. The mass storage device 1210 and the RAM 1214 may also store other types of program modules and data, including the mapping 402, described above.

It should be appreciated that the software components described herein may, when loaded into the CPU 1202 and executed, transform the CPU 1202 and the overall computer 1200 from a general-purpose computing system into a special-purpose computing system customized to facilitate the functionality presented herein. The CPU 1202 may be constructed from any number of transistors or other discrete circuit elements, which may individually or collectively assume any number of states. More specifically, the CPU 1202 may operate as a finite-state machine, in response to executable instructions contained within the software modules disclosed herein. These computer-executable instructions may transform the CPU 1202 by specifying how the CPU 1202 transitions between states, thereby transforming the transistors or other discrete hardware elements constituting the CPU 1202.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1200 in order to store and execute the software components presented herein. It also should be appreciated that the computer 1200 may comprise other types of computing devices, including hand-held computers, embedded computer systems, personal digital assistants, and other types of computing devices known to those skilled in the art. It is also contemplated that the computer 1200 may not include all of the components shown in FIG. 12, may include other components that are not explicitly shown in FIG. 12, or may utilize an architecture completely different than that shown in FIG. 12.

Based on the foregoing, it should be appreciated that technologies for auto-generation of code for performing a transform in an ETL process are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is defined by the claims set forth below.

APPENDIX I

```
<ManagementPack xmlns:xsd="http://www.w3.org/2001/XMLSchema"
xmlns:xsl="http://www.w3.org/1999/XSL/Transform" ContentReadable="true"
SchemaVersion="1.1">
  <Manifest>
    <Identity>
      <ID>SC.SM.Test.Datawarehouse.TestMP</ID>
      <Version>7.0.5202.0</Version>
    </Identity>
    <Name>Warehouse Testing Library</Name>
    <References>
      <Reference Alias="System">
        <ID>System.Library</ID>
        <Version>7.0.5202.0</Version>
        <PublicKeyToken>9396306c2be7fcc4</PublicKeyToken>
      </Reference>
    </References>
  </Manifest>
  <TypeDefinitions>
```

APPENDIX I-continued

```xml
<EntityTypes>
  <ClassTypes>
    <!-- add more attributes with different data type -->
    <ClassType ID="DWTest.Vehicle" Base="System!System.ConfigItem" abstract="true" Accessibility="Public" Hosted="false" Singleton="false">
      <Property ID="PowerBy" Type="string" CaseSensitive="false"/>
    </ClassType>
    <ClassType ID="DWTest.Automobile" Base="DWTest.Vehicle" Abstract="true" Accessibility="Public" Hosted="false" Singleton="false">
      <Property ID="AutomobileId" Type="string" Key="true" CaseSensitive="false"/>
      <Property ID="SpeedLimit" Type="decimal" MaxLength="38" MinLength="1"/>
      <!--Property ID="SpeedLimit" Type="int" MaxValue="200"/-->
      <Property ID="Model" Type="string" CaseSensitive="false"/>
      <Property ID="Maker" Type="enum" EnumType="MakerEnum"/>
    </ClassType>
    <ClassType ID="DWTest.Motor" Base="System!System.ConfigItem" Abstract="true" Accessibility="Public" Hosted="false" Singleton="false">
      <Property ID="MotorId" Type="string" Key="true" CaseSensitive="false"/>
      <!--Property ID="SpeedLimit" Type="decimal" MaxLength="18" MinLength="1"/-->
      <Property ID="SpeedLimit" Type="int" MaxValue="200"/>
      <Property ID="Maker" Type="enum" EnumType="BuilderEnum"/>
    </ClassType>
    <ClassType ID="DWTest.Cargo" Base="DWTest.Motor" Abstract="false" Accessibility="Public" Hosted="false" Singleton="false">
      <Property ID="Load" Type="int" MaxValue="400"/>
    </ClassType>
    <ClassType ID="DWTest.Car" Base="DWTest.Automobile" Abstract="false" Accessibility="Public" Hosted="false" Singleton="false">
      <Property ID="NumberOfDoors" Type="int"/>
    </ClassType>
    <ClassType ID="DWTest.MiniVan" Base="DWTest.Car" Abstract="false" accessibility="Public" Hosted="false" Singleton="false">
      <Property ID="SeatNumber" Type="int"/>
    </ClassType>
    <ClassType ID="DWTest.State" Base="System!System.Entity" Abstract="false" Accessibility="Public" Hosted="false" Singleton="false">
      <Property ID="StateName" Type="string" Key="true" CaseSensitive="false"/>
    </ClassType>
    <ClassType ID="DWTest.InsuranceCompany" Base="System!System.Entity" Abstract="false" Accessibility="Public" Hosted="false" Singleton="false">
      <Property ID="CompanyName" Type="string" Key="true" CaseSensitive="false"/>
      <Property ID="MaxInsureAmount" Type="int" CaseSensitive="false"/>
      <Property ID="NumberOfBranches" Type="int" CaseSensitive="false"/>
    </ClassType>
    <ClassType ID="DWTest.Person" Base="System!System.ConfigItem" Abstract="false" Accessibility="Public" Hosted="false" Singleton="false">
      <Property ID="SSN" Type="string" Key="true" CaseSensitive="false"/>
      <Property ID="Name" Type="string" CaseSensitive="false"/>
    </ClassType>
  </ClassTypes>
  <RelationshipTypes>
    <RelationshipType ID="DWTest.AutomobileRegisterInState" Base="System!System.Reference" Abstract="false" Accessibility="Public">
      <Source ID="Automobile" Type="DWTest.Automobile"/>
      <Target ID="State" MaxCardinality="1" Type="DWTest.State"/>
    </RelationshipType>
    <RelationshipType ID="DWTest.AutomobileInsuredByCompnay" Base="System!System.Reference" Abstract="false" Accessibility="Public">
      <Source ID="Automobile" Type="DWTest.Automobile"/>
      <Target ID="InsuranceCompany" MaxCardinality="1" Type="DWTest.InsuranceCompany"/>
    </RelationshipType>
    <RelationshipType ID="DWTest.AutomobileOwnedByPerson" Base="System!System.Reference" Abstract="false" Accessibility="Public">
      <Source ID="Automobile" Type="DWTest.Automobile"/>
      <Target ID="Owner" Type="DWTest.Person"/>
    </RelationshipType>
  </RelationshipTypes>
  <EnumerationTypes>
    <EnumerationValue ID="MakerEnum" Accessibility="Public" />
    <EnumerationValue ID="Maker.Toyota" Parent="MakerEnum" Accessibility="Public" />
    <EnumerationValue ID="Maker.Toyota.Camry" Parent="Maker.Toyota" Accessibility="Public" />
    <EnumerationValue ID="Maker.Toyota.Corolla" Parent="Maker.Toyota" Accessibility="Public" />
```

APPENDIX I-continued

```
    <EnumerationValue ID="Maker.Toyota.RAV4" Parent="Maker.Toyota" Accessibility="Public" />
    <EnumerationValue ID="Maker.Honda" Parent="MakerEnum" Accessibility="Public" />
    <EnumerationValue ID="Maker.GM" Parent="MakerEnum" Accessibility="Public" />
    <EnumerationValue ID="Maker.Audi" Parent="MakerEnum" Accessibility="Public" />
    <EnumerationValue ID="BuilderEnum" Accessibility="Public" />
    <EnumerationValue ID="Builder.BMW" Parent="BuilderEnum" Accessibility="Public" />
    <EnumerationValue ID="Builder.Suboru" Parent="BuilderEnum" Accessibility="Public" />
    </EnumerationTypes>
   </EntityTypes>
  </TypeDefinitions>
</ManagementPack>
```

APPENDIX II

```
<ManagementPack xmlns:xsd="http://www.w3.org/2001/XMLSchema" xmlns:xsl="http://www.w3.org/1999/XSL/Transform" ContentReadable="true" SchemaVersion="1.1">
 <Manifest>
  <Identity>
   <ID>SC.SM.Test.Datawarehouse.TestMP2</ID>
   <Version>7.0.5202.0</Version>
  </Identity>
  <Name>Warehouse Testing Library 2</Name>
  <References>
   <Reference Alias="DWTest">
    <ID>SC.SM.Test.Datawarehouse.TestMP</ID>
    <Version>7.0.5202.0</Version>
    <PublicKeyToken>9396306c2be7fcc4</PublicKeyToken>
   </Reference>
   <Reference Alias="DWBase">
    <ID>Microsoft.SystemCenter.Datawarehouse.Base</ID>
    <Version>7.0.5202.0</Version>
    <PublicKeyToken>9396306c2be7fcc4</PublicKeyToken>
   </Reference>
  </References>
 </Manifest>
 <TypeDefinitions>
  <EntityTypes>
   <EnumerationTypes>
    <EnumerationValue ID="DWTestDomain" Accessibility="Public" Parent="DWBase!Domain" />
   </EnumerationTypes>
  </EntityTypes>
 </TypeDefinitions>
 <Warehouse>
  <Outriggers>
   <Outrigger ID="Makers" Accessibility="Public">
    <Attribute ID="Maker" PropertyPath="$Context/Property[Type='DWTest!DWTest.Automobile']/Maker$" />
    <Attribute ID="MotorMaker" PropertyPath="$Context/Property[Type='DWTest!DWTest.Motor']/Maker$" />
   </Outrigger>
   <Outrigger ID="States" Accessibility="Public">
    <Attribute ID="StateName" PropertyPath="$Context/Property[Type='DWTest!DWTest.State']/StateName$" />
   </Outrigger>
   <Outrigger ID="InsuranceCompanys" Accessibility="Public">
    <Attribute ID="CompanyName" PropertyPath="$Context/Property[Type='DWTest!DWTest.InsuranceCompany']/CompanyName$" />
   </Outrigger>
   <!--Outrigger ID="StateInsuranceCompanys" Accessibility="Public">
    <Attribute ID="CompanyName2" PropertyPath="$Context/Property[Type='DWTest!DWTest.InsuranceCompany']/CompanyName$" />
    <Attribute ID="StateName" PropertyPath="$Context/Property[Type='DWTest!DWTest.State']/StateName$" />
   </Outrigger-->
  </Outriggers>
  <Dimensions>
   <Dimension ID="DWVehicleDim" Accessibility="Public"
```

APPENDIX II-continued

```
InferredDimension="true" Target="DWTest!DWTest.Vehicle"
HierarchySupport="IncludeExtendedClassProperties" Reconcile="false">
    </Dimension>
    <Dimension ID="AutomobileDim" Accessibility="Public"
InferredDimension="true" Target="DWTest!DWTest.Automobile"
HierarchySupport="IncludeExtendedClassProperties" Reconcile="false">
        <!--InclusionAttribute ID="AutomobileId"
PropertyPath="$Context/Property[Type='DWTest!DWTest.Automobile']/Automobile
Id$" SlowlyChangingAttribute="false" />
        <InclusionAttribute ID="Manufacture"
PropertyPath="$Context/Property[Type='DWTest!DWTest.Automobile']/Maker$"
SlowlyChangingAttribute="false" /-->
    </Dimension>
    <Dimension ID="MotorDim" Accessibility="Public" InferredDimension="true"
Target="DWTest!DWTest.Motor"
HierarchySupport="IncludeExtendedClassProperties" Reconcile="false">
    </Dimension>
    <Dimension ID="DWTestCarDim" Accessibility="Public"
InferredDimension="true" Target="DWTest!DWTest.Car"
HierarchySupport="IncludeDerivedClassProperties" Reconcile="false">
    </Dimension>
    <Dimension ID="InsuranceCompanyDim" Accessibility="Public"
InferredDimension="true" Target="DWTest!DWTest.InsuranceCompany"
HierarchySupport="IncludeExtendedClassProperties" Reconcile="false">
    </Dimension>
    <Dimension ID="StateDim" Accessibility="Public" InferredDimension="true"
Target="DWTest!DWTest.State" HierarchySupport="IncludeDerivedClassProperties"
Reconcile="false">
    </Dimension>
    <Dimension ID="PersonDim" Accessibility="Public" InferredDimension="true"
Target="DWTest!DWTest.Person"
HierarchySupport="IncludeDerivedClassProperties" Reconcile="false">
    </Dimension>
  </Dimensions>
  <Facts>
    <RelationshipFact ID="AutomobileRegisterInStateFact" Accessibility="Public"
Domain="DWTestDomain" TimeGrain="Daily"
SourceType="DWTest!DWTest.Automobile" SourceDimension="AutomobileDim">
      <Relationships
RelationshipType="DWTest!DWTest.AutomobileRegisterInState"
TargetDimension="StateDim"/>
    </RelationshipFact>
    <RelationshipFact ID="AutomobileInsuredByCompnayFact"
Accessibility="Public" Domain="DWTestDomain" TimeGrain="Daily"
SourceType="DWTest!DWTest.Automobile" SourceDimension="AutomobileDim">
      <Relationships
RelationshipType="DWTest!DWTest.AutomobileInsuredByCompnay"
TargetDimension="InsuranceCompanyDim"/>
    </RelationshipFact>
    <RelationshipFact ID="AutomobileOwnedByPersonFact" Accessibility="Public"
Domain="DWTestDomain" TimeGrain="Daily"
SourceType="DWTest!DWTest.Automobile" SourceDimension="AutomobileDim">
      <Relationships
RelationshipType="DWTest!DWTest.AutomobileOwnedByPerson"
TargetDimension="PersonDim"/>
    </RelationshipFact>
  </Facts>
 </Warehouse>
</ManagementPack>
```

APPENDIX III

```
--EXAMPLE OF DIMENSION TRANSFORM
ALTER PROCEDURE [dbo].[TransformComputerDimProc](@WaterMark XML)
AS BEGIN
SET NOCOUNT ON
        DECLARE
   @WM datetime
                ,@MaxWaterMark datetime
                ,@BatchId int
                ,@Inserted int
                ,@err int
                ,@Updated int
                ,@nullguid uniqueidentifier
        SET @nullguid = '00000000-0000-0000-0000-000000000000'
        SELECT * INTO #tempTable FROM
etl.ShredWaterMark(@WaterMark)
```

APPENDIX III-continued

```
            SELECT @WM=WaterMark, @BatchId=BatchId,
@MaxWaterMark=MaxWaterMark
                FROM #tempTable
                WHERE WarehouseEntityName='MTV_Computer'
                    AND WaterMarkType='DateTime'
    SET @MaxWaterMark = GETUTCDATE( )
    UPDATE dest
    SET
                    [DisplayName] = source.[System.Entity!DisplayName],
                    [Notes] = source.[System.ConfigItem!Notes],
                    [LastInventoryDate] =
source.[Microsoft.Windows.Computer!LastInventoryDate],
                    [LogicalProcessors] =
source.[Microsoft.Windows.Computer!LogicalProcessors],
                    [ForestDnsName] =
source.[Microsoft.Windows.Computer!ForestDnsName],
                    [NetbiosDomainName] =
source.[Microsoft.Windows.Computer!NetbiosDomainName],
                    [NetbiosComputerName] =
source.[Microsoft.Windows.Computer!NetbiosComputerName],
                    [OrganizationalUnit] =
source.[Microsoft.Windows.Computer!OrganizationalUnit],
                    [NetworkName] =
source.[Microsoft.Windows.Computer!NetworkName],
                    [OffsetInMinuteFromGreenwichTime] =
source.[Microsoft.Windows.Computer!OffsetInMinuteFromGreenwichTime],
                    [DNSName] =
source.[Microsoft.Windows.Computer!DNSName],
                    [IsVirtualMachine] =
source.[Microsoft.Windows.Computer!IsVirtualMachine],
                    [ActiveDirectorySite] =
source.[Microsoft.Windows.Computer!ActiveDirectorySite],
                    [IPAddress] =
source.[Microsoft.Windows.Computer!IPAddress],
                    [PrincipalName] =
source.[Microsoft.Windows.Computer!PrincipalName],
                    [DomainDnsName] =
source.[Microsoft.Windows.Computer!DomainDnsName],
                    [ActiveDirectoryObjectSid] =
source.[Microsoft.Windows.Computer!ActiveDirectoryObjectSid],
                    [ObjectStatus_ConfigItemObjectStatusId] =
outriggerSrc1.[ConfigItemObjectStatusId],
                    [ObjectStatus] = outriggerSrc1.ID,
                    [AssetStatus_ConfigItemAssetStatusId] =
outriggerSrc2.[ConfigItemAssetStatusId],
                    [AssetStatus] = outriggerSrc2.ID,
        [IsDeleted] = baseEntityDim.[IsDeleted],
        [SourceId] = source.[DatasourceId],
        [UpdatedBatchId] = @BatchId
        FROM inbound.MTV_Computer source
            LEFT JOIN dbo.ConfigItemObjectStatus outriggerSrc1 ON
(outriggerSrc1.EnumTypeId = source.[System.ConfigItem!ObjectStatus])
            LEFT JOIN dbo.ConfigItemAssetStatus outriggerSrc2 ON
(outriggerSrc2.EnumTypeId = source.[System.ConfigItem!AssetStatus])
        INNER JOIN dbo.EntityDim baseEntityDim ON
(source.BaseManagedEntityId=baseEntityDim.BaseManagedEntityId AND
source.DatasourceId=baseEntityDim.SourceId)
        INNER JOIN dbo.ComputerDimvw dest ON
(source.BaseManagedEntityId=dest.BaseManagedEntityId),
            (
                SELECT MAX(DWTimestamp) AS maxModifiedTime,
BaseManagedEntityId AS entityId, CAST(MIN(CAST(DatasourceId AS
nvarchar(36))) AS uniqueidentifier) AS DatasourceId
                FROM inbound.MTV_Computer source
                    WHERE source.DWTimestamp >= @WM AND
source.DWTimestamp < @MaxWaterMark
                    GROUP BY BaseManagedEntityId
                ) maxResults
            WHERE dest.BaseManagedEntityId is not null and
source.DWTimestamp >= @WM and source.DWTimestamp < @MaxWaterMark
        AND source.DWTimestamp = maxResults.maxModifiedTime
        AND source.BaseManagedEntityId = maxResults.entityId
        AND source.DatasourceId = maxResults.DatasourceId
        AND source.[Microsoft.Windows.Computer] = 1
            SELECT @Updated=@@RowCount,@err=@@error
            IF(@err<>0)
            BEGIN
                RAISERROR('Failed to update ComputerDim Dimension',
16,1)
                RETURN
```

APPENDIX III-continued

```
            END
INSERT INTO dbo.ComputerDimvw
    (
    [BaseManagedEntityId],
    [EntityDimKey],
                [DisplayName],
                [Notes],
                [LastInventoryDate],
                [LogicalProcessors],
                [ForestDnsName],
                [NetbiosDomainName],
                [NetbiosComputerName],
                [OrganizationalUnit],
                [NetworkName],
                [OffsetInMinuteFromGreenwichTime],
                [DNSName],
                [IsVirtualMachine],
                [ActiveDirectorySite],
                [IPAddress],
                [PrincipalName],
                [DomainDnsName],
                [ActiveDirectoryObjectSid],
                [ObjectStatus_ConfigItemObjectStatusId],
                [ObjectStatus],
                [AssetStatus_ConfigItemAssetStatusId],
                [AssetStatus],
    [IsDeleted],
    [SourceId],
    [InsertedBatchId],
    [UpdatedBatchId]
    )
SELECT DISTINCT
    baseEntityDim.BaseManagedEntityId,
    baseEntityDim.EntityDimKey,
                source.[System.Entity!DisplayName],
                source.[System.ConfigItem!Notes],
                source.[Microsoft.Windows.Computer!LastInventoryDate],
                source.[Microsoft.Windows.Computer!LogicalProcessors],
                source.[Microsoft.Windows.Computer!ForestDnsName],
                source.[Microsoft.Windows.Computer!NetbiosDomainName],
            source.[Microsoft.Windows.Computer!NetbiosComputerName],
                source.[Microsoft.Windows.Computer!OrganizationalUnit],
                source.[Microsoft.Windows.Computer!NetworkName],
                source.[Microsoft.Windows.Computer!OffsetInMinuteFromGreenwich
Time],
                source.[Microsoft.Windows.Computer!DNSName],
                source.[Microsoft.Windows.Computer!IsVirtualMachine],
                source.[Microsoft.Windows.Computer!ActiveDirectorySite],
                source.[Microsoft.Windows.Computer!IPAddress],
                source.[Microsoft.Windows.Computer!PrincipalName],
                source.[Microsoft.Windows.Computer!DomainDnsName],
            source.[Microsoft.Windows.Computer!ActiveDirectoryObjectSid],
                outriggerSrc1.[ConfigItemObjectStatusId],
                outriggerSrc1.[ID],
                outriggerSrc2.[ConfigItemAssetStatusId],
                outriggerSrc2.[ID],
            baseEntityDim.[IsDeleted],
            source.[DatasourceId],
            @BatchId,
                0
    FROM inbound.MTV_Computer source
    INNER JOIN dbo.EntityDim baseEntityDim ON
(source.BaseManagedEntityId=baseEntityDim.BaseManagedEntityId AND
source.DatasourceId=baseEntityDim.SourceId)
            LEFT JOIN dbo.ComputerDimvw dest ON
(source.BaseManagedEntityId=dest.BaseManagedEntityId)
            LEFT JOIN dbo.ConfigItemObjectStatus outriggerSrc1 ON
(outriggerSrc1.EnumTypeId = source.[System.ConfigItem!ObjectStatus])
            LEFT JOIN dbo.ConfigItemAssetStatus outriggerSrc2 ON
(outriggerSrc2.EnumTypeId = source.[System.ConfigItem!AssetStatus]),
            (
                SELECT MAX(DWTimestamp) AS maxModifiedTime,
BaseManagedEntityId AS entityId, CAST(MIN(CAST(DatasourceId AS
nvarchar(36))) AS uniqueidentifier) AS DatasourceId
                FROM inbound.MTV_Computer source
                WHERE source.DWTimestamp >= @WM AND
source.DWTimestamp < @MaxWaterMark
                GROUP BY BaseManagedEntityId
            ) maxResults
            WHERE dest.BaseManagedEntityId is null AND
```

APPENDIX III-continued

```
source.DWTimestamp >= @WM AND source.DWTimestamp < @MaxWaterMark
   AND source.DWTimestamp = maxResults.maxModifiedTime
   AND source.BaseManagedEntityId = maxResults.entityId
   AND source.DatasourceId = maxResults.DatasourceId
   AND source.[Microsoft.Windows.Computer] = 1
            select @Inserted=@@RowCount,@err=@@error
            IF(@err<>0)
            BEGIN
                RAISERROR('Failed to insert into ComputerDim Dimension',
16,1)
                RETURN
            END
            UPDATE dest
                SET dest.IsDeleted = baseEntityDim.IsDeleted
            FROM inbound.MTV_Computer source
                INNER JOIN dbo.EntityDim baseEntityDim ON
(source.BaseManagedEntityId = baseEntityDim.BaseManagedEntityId AND
source.DatasourceId = baseEntityDim.SourceId)
                INNER JOIN dbo.ComputerDimvw dest ON
(baseEntityDim.EntityDimKey = dest.EntityDimKey)
                WHERE baseEntityDim.UpdatedBatchId = @BatchId
    AND source.[Microsoft.Windows.Computer] = 1
    UPDATE source SET
       DWTimestamp = @MaxWaterMark
    FROM inbound.MTV_Computer source
    LEFT JOIN dbo.EntityDim baseEntityDim ON (source.BaseManagedEntityId =
baseEntityDim.BaseManagedEntityId AND source.DatasourceId =
baseEntityDim.SourceId)
    WHERE source.DWTimestamp >= @WM AND source.DWTimestamp <
@MaxWaterMark
    AND baseEntityDim.BaseManagedEntityId is null
            UPDATE #tempTable SET WaterMark = CONVERT(nvarchar(64),
ISNULL(@MaxWaterMark,WaterMark),109)
     WHERE WarehouseEntityName='MTV_Computer' AND
WaterMarkType='DateTime'
            IF(@err <> 0)
            BEGIN
                RAISERROR('Failed to update set watermark', 16,1)
                RETURN
            END
            SELECT @WaterMark = (SELECT ModuleName AS
"@ModuleName",
                   ProcessName AS "@ProcessName",
                   @BatchId AS "@BatchId",
                   (SELECT DISTINCT WarehouseEntityName AS
"@WarehouseEntityName",
                       WarehouseEntityTypeName AS
"@WarehouseEntityTypeName",
                       EntityGuid AS "@EntityGuid",
                       CASE WarehouseEntityTypeName
                           WHEN 'Inbound' THEN 'DateTime'
                       WHEN 'Enumeration' THEN 'DateTime'
                           ELSE 'BatchId' END AS "@WaterMarkType",
                       CASE WarehouseEntityTypeName
                           WHEN 'Inbound' THEN
CONVERT(nvarchar(64), WaterMark, 109)
                           WHEN 'Enumeration' THEN
CONVERT(nvarchar(64), WaterMark, 109)
                           ELSE CAST(@BatchId AS nvarchar(64)) END
AS "@WaterMark"
                       FROM #tempTable
                       FOR xml path('Entity'),type)
                   FROM (SELECT DISTINCT ModuleName, ProcessName
FROM #tempTable) a
                   FOR xml path('Module'),type)
            SELECT @WaterMark AS WaterMark, @BatchId AS BatchId,
@Updated AS UpdatedRowCount, @Inserted AS InsertedRowCount
cleanup:
            IF OBJECT_ID('tempdb..#tempTable') IS NOT NULL
            BEGIN
                DROP TABLE #tempTable
            END
SET NOCOUNT OFF
END
```

APPENDIX IV

```
--EXAMPLE OF RELATIONSHIP FACT TRANSFORM
ALTER PROCEDURE
[dbo].[TransformComputerHostsOperatingSystemFactProc](@WaterMark XML)
AS BEGIN
SET NOCOUNT ON
SET XACT_ABORT ON
    DECLARE @errorNumber              INT,
        @errorSeverity         INT,
        @errorState            INT,
        @errorLine             INT,
        @errorProcedure              NVARCHAR(256),
        @errorMessage                NVARCHAR(MAX),
        @task                  NVARCHAR(512)
    DECLARE @BatchId                 INT,
        @Updated               INT           = 0,
        @Inserted              INT           = 0,
        @retval                INT           = -1,
        @err                   INT           = 0,
        @startTranCount              INT            = @@TRANCOUNT,
        @source1WM                   DATETIME,
        @source1MaxWM                DATETIME       = GETUTCDATE( )
BEGIN TRY
    SELECT @task = 'Shredding WaterMark'
    SELECT *
    INTO   #tempTable
    FROM   ETL.ShredWaterMark(@WaterMark)
    SELECT     @task = 'Reading WaterMark for @source1WM and @BatchId'
    SELECT     @source1WM = WaterMark,
        @BatchId = BatchId
    FROM   #tempTable
    WHERE      WarehouseEntityName =
'MTV_Microsoft$Windows$ComputerHostsOperatingSystem'
        AND WaterMarkType = 'DateTime'
    /*
*************************************************************************
***************************
    * Step 1: Prepare a temp table with following bits of information:
    * Step 2: 'Close' all the 'Open' events within the Batch
    * Step 3: Delete unnecessary events (events that are either already present in the
fact or
    *     that have been accounted for in the previous step) from the temp table
    * Step 4: Update the fact to 'Close' all the 'Open' relationships
    * Step 5: Insert new relationships
*************************************************************************
***************************
    */
    SELECT @task = 'Step 1: Preparing #TransformTemp1'
    EXEC @err = dbo.InferDatasourceDimProc
        @sourceTableName             =
'inbound.MTV_Microsoft$Windows$ComputerHostsOperatingSystem',
        @columnName            = 'DataSourceId',
        @filterColumnName             = 'DWTimeStamp',
        @minTimeStamp          = @source1WM,
        @maxTimeStamp          = @source1MaxWM,
        @batchId         = @BatchId
    SELECT @task = 'Step 1: Preparing #TransformTemp1'
    SELECT sourceDim.ComputerDimKey AS EntityDimKey,
        targetDim.OperatingSystemDimKey AS TargetEntityDimKey,
        dt.DateKey AS DateKey,
        MIN(isnull(source.TimeAdded, rel.CreatedDate)) AS MinCreatedDate,
        MAX(isnull(source.TimeAdded, rel.CreatedDate)) AS MaxCreatedDate,
        MIN(CASE WHEN rel.DeletedDate = '9999/01/01' THEN NULL ELSE
rel.DeletedDate END) AS MinDeletedDate,
        MAX(CASE WHEN rel.DeletedDate = '9999/01/01' THEN NULL ELSE
rel.DeletedDate END) AS MaxDeletedDate,
        CASE WHEN MAX(source.TimeAdded) > MAX(CASE WHEN
rel.DeletedDate = '9999/01/01' THEN '1900/01/01' ELSE source.LastModified END)
THEN 'Open' ELSE 'Closed' END AS FinalStatusOfTheDay,
        MAX(CASE WHEN dest.DateKey IS NULL THEN 0 ELSE 1 END) AS
IsRelationshipPresentInFact,
        MIN(dest.CreatedDate) AS CreatedDateInFact,
        MAX(dest.DeletedDate) AS DeletedDateInFact,
        MIN(CAST(source.SourceEntityId AS VARCHAR(128))) SourceBMEId,
        MIN(CAST(source.TargetEntityId AS VARCHAR(128))) TargetBMEId,
        MIN(CAST(source.DatasourceId AS VARCHAR(128))) SourceId,
        MIN(CAST(source.RelationshipTypeId AS VARCHAR(128)))
RelationshipTypeId,
        ROW_NUMBER( ) OVER( PARTITION BY
sourceDim.ComputerDimKey,
                targetDim.OperatingSystemDimKey
```

APPENDIX IV-continued

```sql
            ORDER BY   dt.DateKey
         ) AS SequenceOfDays
   INTO  #transformTemp1
   FROM     inbound.MTV_Microsoft$Windows$ComputerHostsOperatingSystem source
   FULL OUTER JOIN
      (
      SELECT fact.DateKey, fact.EntityDimKey, fact.TargetEntityDimKey,
dimEntSrc.BaseManagedEntityId as SourceBMEId, dimEntTg.BaseManagedEntityId
as TargetBMEId, fact.DataSourceDimKey, dimDSRel.SourceId,
fact.RelationshipTypeDimKey, relType.RelationshipTypeId, MIN(fact.CreatedDate)
AS CreatedDate, MAX(ISNULL(DeletedDate, '9999/01/01')) AS DeletedDate
         FROM      dbo.EntityRelatesToEntityFactvw fact
         JOIN      dbo.DataSourceDimvw dimDSRel ON
            dimDSRel.DataSourceDimKey = fact.DatasourceDimKey
         JOIN dbo.EntityDim dimEntSrc ON
            dimEntSrc.EntityDimKey = fact.EntityDimKey
            and dimDSRel.SourceId = dimEntSrc.SourceId
         JOIN dbo.EntityDim dimEntTg ON
            dimEntTg.EntityDimKey = fact.TargetEntityDimKey
            and dimDSRel.SourceId = dimEntTg.SourceId
         JOIN dbo.RelationshipTypeDim relType ON
            fact.RelationshipTypeDimKey = relType.RelationshipTypeDimKey
         WHERE relType.RelationshipTypeId = 'b73fbcc7-d5b6-b3cb-0d16-
0a3a11a9bcc6'
         GROUP BY fact.DateKey, fact.EntityDimKey, fact.TargetEntityDimKey,
fact.DataSourceDimKey, dimEntSrc.BaseManagedEntityId,
dimEntTg.BaseManagedEntityId, dimDSRel.SourceId,
fact.RelationshipTypeDimKey, relType.RelationshipTypeId
         ) as rel ON
         source.SourceEntityId = rel.SourceBMEId
         and source.TargetEntityId = rel.TargetBMEId
         and source.DatasourceId = rel.SourceId
         and source.RelationshipTypeId = rel.RelationshipTypeId
         and etl.GetDateKey(source.TimeAdded) = rel.DateKey
         and source.DWTimeSTamp >= @source1WM
         and source.DWTimeSTamp < @source1MaxWM
      join dbo.DateDim dt ON
         dt.DateKey = etl.GetDateKey(source.TimeAdded)
      or   dt.DateKey = rel.DateKey
   JOIN    dbo.EntityDimvw dimEntSrc ON
         dimEntSrc.BaseManagedEntityId = isnull(source.SourceEntityId,
rel.SourceBMEId)
         AND dimEntSrc.SourceId = isnull(source.DatasourceId, rel.SourceId)
   JOIN    dbo.EntityDimvw dimEntTarget ON
         dimEntTarget.BaseManagedEntityId = isnull(source.TargetEntityId,
rel.TargetBMEId)
         AND dimEntTarget.SourceId = isnull(source.DatasourceId, rel.SourceId)
   JOIN    dbo.DataSourceDimvw dimDS ON
         dimDS.SourceId = isnull(source.DatasourceId, rel.SourceId)
   JOIN    dbo.ComputerDim sourceDim ON
         sourceDim.BaseManagedEntityId=isnull(dimEntSrc.BaseManagedEntityId,
rel.SourceBMEId)
   JOIN    dbo.OperatingSystemDim targetDim ON
targetDim.BaseManagedEntityId=isnull(dimEntTarget.BaseManagedEntityId,
rel.TargetBMEId)
   LEFT JOIN     dbo.ComputerHostsOperatingSystemFactvw dest ON
         dest.ComputerDimKey = sourceDim.ComputerDimKey
         AND dest.ComputerHostsOperatingSystem_OperatingSystemDimKey =
targetDim.OperatingSystemDimKey
         AND dest.DateKey = isnull(etl.GetDateKey(source.TimeAdded),
rel.DateKey)
      WHERE (source.SourceEntityId IS NOT NULL OR rel.DeletedDate <>
'9999/01/01')
         and (source.DWTimestamp is null or source.DWTimestamp >=
@source1WM)
         and (source.DWTimestamp is null or source.DWTimestamp <
@source1MaxWM)
      GROUP BY
         sourceDim.ComputerDimKey,
         targetDim.OperatingSystemDimKey,
         dt.DateKey
   INSERT INTO #transformTemp1 (
      EntityDimKey,
      TargetEntityDimKey,
      DateKey,
      MinCreatedDate,
      MaxCreatedDate,
      MinDeletedDate,
      MaxDeletedDate,
```

APPENDIX IV-continued

```
        FinalStatusOfTheDay,
        IsRelationshipPresentInFact,
        CreatedDateInFact,
        DeletedDateInFact,
        SequenceOfDays
        )
    SELECT source.ComputerDimKey AS EntityDimKey,
        source.ComputerHostsOperatingSystem_OperatingSystemDimKey AS
TargetEntityDimKey,
        source.DateKey,
        MIN(txTemp1.MinCreatedDate) AS MinCreatedDate,
        MAX(txTemp1.MaxCreatedDate) AS MaxCreatedDate,
        MIN(txTemp1.MinDeletedDate) AS MinDeletedDate,
        MAX(txTemp1.MaxDeletedDate) AS MaxDeletedDate,
        MAX(txTemp1.FinalStatusOfTheDay) AS FinalStatusOfTheDay,
        1 IsRelationshipPresentInFact,
        MIN(source.CreatedDate) AS CreatedDateInFact,
        MAX(source.DeletedDate) AS DeletedDateInFact,
        0 AS SequenceOfDays
    FROM      dbo.ComputerHostsOperatingSystemFactvw source
    INNER JOIN       #transformTemp1 txTemp1 ON
        source.ComputerDimKey = txTemp1.EntityDimKey
        AND source.ComputerHostsOperatingSystem_OperatingSystemDimKey =
txTemp1.TargetEntityDimKey
        AND source.DeletedDate IS NULL -- Relationship exists
        AND source.DateKey < txTemp1.DateKey -- newer relationship has arrived
(meaning, we need to close the old ones)
    LEFT JOIN        #transformTemp1 txTemp2 ON
         source.ComputerDimKey = txTemp2.EntityDimKey
        AND source.ComputerHostsOperatingSystem_OperatingSystemDimKey =
txTemp2.TargetEntityDimKey
        AND source.DateKey = txTemp2.DateKey
    WHERE   txTemp2.DateKey IS NULL -- make sure that no event exists for this
specific day (coz if it does exist then we need to use that event for fact transforms)
    GROUP BY
        source.ComputerDimKey,
        source.ComputerHostsOperatingSystem_OperatingSystemDimKey,
        source.DateKey
    UPDATE          currentRel SET
        MaxDeletedDate = nextRel.MinCreatedDate, -- Close time of the current
relationship is equal to the Open time of the next relationship
        FinalStatusOfTheDay = 'Closed'
    FROM           #transformTemp1 currentRel
    INNER JOIN       #transformTemp1 nextRel ON
        currentRel.EntityDimKey = nextRel.EntityDimKey
        AND currentRel.TargetEntityDimKey = nextRel.TargetEntityDimKey
        AND currentRel.SequenceOfDays = nextRel.SequenceOfDays – 1
    WHERE          currentRel.MaxDeletedDate IS NULL
    BEGIN TRANSACTION
    SELECT @task = 'Step 4: Updating Facts'
    UPDATE fact SET
        CreatedDate = source.MinCreatedDate,
        DeletedDate = CASE WHEN source.FinalStatusOfTheDay = 'Open' OR
source.MaxCreatedDate > source.MaxDeletedDate THEN NULL ELSE
source.MaxDeletedDate END,
        UpdatedBatchId = @BatchId
    FROM      dbo.ComputerHostsOperatingSystemFactvw fact
    JOIN     #transformTemp1 source ON
        source.EntityDimKey = fact.ComputerDimKey
        AND source.TargetEntityDimKey =
fact.ComputerHostsOperatingSystem_OperatingSystemDimKey
        AND source.DateKey = fact.DateKey
    WHERE          source.IsRelationshipPresentInFact = 1
        AND (         source.MinCreatedDate < source.CreatedDateInFact
            OR (COALESCE(source.MaxDeletedDate, source.DeletedDateInFact)
IS NOT NULL AND ISNULL(source.MaxDeletedDate, '9999/01/01') >
ISNULL(source.DeletedDateInFact, '1900/01/01'))
                -- COALESCE is only to make sure that we do not end up updating the
row if both of the fields are already NULL
            OR (source.FinalStatusOfTheDay = 'Open' AND
source.DeletedDateInFact IS NOT NULL)
        )
    SELECT @Updated = @@RowCount,
        @err = @@error
    SELECT @task = 'Step 5: Deleting unnecessary events from #TransformTemp1'
    DELETE    txTemp
    FROM      #transformTemp1 txTemp
    INNER JOIN         dbo.ComputerHostsOperatingSystemFactvw fact ON
        fact.ComputerDimKey = txTemp.EntityDimKey
        AND fact.ComputerHostsOperatingSystem_OperatingSystemDimKey =
```

APPENDIX IV-continued

```
txTemp.TargetEntityDimKey
        AND fact.DateKey = txTemp.DateKey
    SELECT @task = 'Step 6: Inserting Facts'
    INSERT INTO         dbo.ComputerHostsOperatingSystemFactvw (
        DateKey,
        ComputerDimKey,
        ComputerHostsOperatingSystem_OperatingSystemDimKey,
        CreatedDate,
        DeletedDate,
        InsertedBatchId,
        UpdatedBatchId
        )
    SELECT DISTINCT
        source.DateKey,
        source.EntityDimKey,
        source.TargetEntityDimKey,
        source.MinCreatedDate,
        CASE WHEN source.FinalStatusOfTheDay = 'Open' OR
source.MaxCreatedDate > source.MaxDeletedDate THEN NULL ELSE
source.MaxDeletedDate END,
        @BatchId as InsertedBatchId,
        0 as UpdatedBatchId
    FROM      #transformTemp1 source
    WHERE     source.IsRelationshipPresentInFact = 0
    SELECT    @Inserted = @@RowCount,
        @err = @@error
    COMMIT TRANSACTION
    UPDATE source SET
        DWTimeSTamp = @source1MaxWM
    FROM      inbound.MTV_Microsoft$Windows$ComputerHostsOperatingSystem
source
    LEFT JOIN #transformTemp1 txTemp1 ON
        source.SourceEntityId = CAST(txTemp1.SourceBMEId AS
UNIQUEIDENTIFIER)
        AND source.TargetEntityId = CAST(txTemp1.TargetBMEId AS
UNIQUEIDENTIFIER)
        AND source.DatasourceId = CAST(txTemp1.SourceId AS
UNIQUEIDENTIFIER)
        AND source.RelationshipTypeId = CAST(txTemp1.RelationshipTypeId AS
UNIQUEIDENTIFIER)
        AND txTemp1.SourceBMEId IS NOT NULL
    WHERE   source.DWTimestamp >= @source1WM
        AND source.DWTimestamp < @source1MaxWM
        AND txTemp1.SourceBMEId IS NULL
    SELECT @task = 'Step 6: Updating WaterMark'
    UPDATE #tempTable SET
        WaterMark = CONVERT(NVARCHAR(64), @source1MaxWM, 109)
    WHERE   WarehouseEntityName =
N'MTV_Microsoft$Windows$ComputerHostsOperatingSystem'
        AND WaterMarkType= N'DateTime'
    SELECT @task = 'Step 7: Preparing WaterMark for returning'
    SELECT @WaterMark = (SELECT ModuleName AS "@ModuleName",
                ProcessName AS "@ProcessName",
                @BatchId AS "@BatchId",
                (SELECT DISTINCT WarehouseEntityName AS
"@WarehouseEntityName",
                    WarehouseEntityTypeName AS
"@WarehouseEntityTypeName",
                    EntityGuid AS "@EntityGuid",
                    CASE WarehouseEntityTypeName
                        WHEN 'Inbound' THEN 'DateTime'
                        WHEN 'Enumeration' THEN 'DateTime'
                        ELSE 'BatchId'
                    END AS "@WaterMarkType",
                        CASE WarehouseEntityTypeName
                            WHEN 'Inbound' THEN
CONVERT(NVARCHAR(64), WaterMark, 109)
                            WHEN 'Enumeration' THEN
CONVERT(NVARCHAR(64), WaterMark, 109)
                            ELSE CAST(@BatchId AS
NVARCHAR(64))
                    END AS "@WaterMark"
                FROM #tempTable
                FOR XML path('Entity'), type)
    FROM (SELECT DISTINCT ModuleName, ProcessName from #tempTable) a
    FOR XML path('Module'), type)
    SELECT @WaterMark AS WaterMark,
        @BatchId AS BatchId,
        @Updated AS UpdatedRowCount,
        @Inserted AS InsertedRowCount
```

APPENDIX IV-continued

```
    END TRY
    BEGIN CATCH
        DECLARE @errorFmt              VARCHAR(256)
        SELECT @errorFmt               = N'ErrorNumber="%d" Message="%s" Severity="%d" State="%d" ProcedureName="%s" LineNumber="%d" Task="%s"',
            @errorNumber           = ERROR_NUMBER( ),
            @errorMessage          = ERROR_MESSAGE( ),
            @errorSeverity         = ERROR_SEVERITY( ),
            @errorState            = ERROR_STATE( ),
            @errorLine             = ERROR_LINE( ),
            @errorProcedure        = ERROR_PROCEDURE( )
        IF(@@TRANCOUNT > @startTranCount) ROLLBACK TRANSACTION
        IF OBJECT_ID('tempdb..#tempTable') IS NOT NULL
        BEGIN
            DROP TABLE #tempTable
        END
        IF OBJECT_ID('tempdb..#transformTemp1') IS NOT NULL
        BEGIN
            DROP TABLE #transformTemp1
        END
        RAISERROR (
            @errorFmt,
            @errorSeverity,
            @errorState,
            @errorNumber,
            @errorMessage,
            @errorSeverity,
            @errorState,
            @errorProcedure,
            @errorLine,
            @task
        )
        RETURN -1
    END CATCH
SET XACT_ABORT OFF
SET NOCOUNT OFF
END
```

APPENDIX V

```
--EXAMPLE OF OUTRIGGER TRANSFORM
ALTER PROCEDURE [dbo].[TransformIncidentImpactProc](@WaterMark XML)
AS BEGIN
SET NOCOUNT ON
DECLARE @utcDate datetime = getutcdate( )
DECLARE @BatchId int,
            @SystemWorkItemTroubleTicketImpactEnumWM datetime,
            @SystemWorkItemTroubleTicketImpactEnummaxWM
datetime = @utcDate,
            @Inserted int,
            @err int,
            @Updated int
SELECT * INTO #tempTable FROM etl.ShredWaterMark(@WaterMark)
SELECT TOP 1 @BatchId = BatchId FROM #tempTable
select @SystemWorkItemTroubleTicketImpactEnumWM=WaterMark
        from #tempTable
        where
WarehouseEntityName='System.WorkItem.TroubleTicket.ImpactEnum'
        and WaterMarkType='DateTime'
select @SystemWorkItemTroubleTicketImpactEnumWM =
isnull(@SystemWorkItemTroubleTicketImpactEnumWM,'1/1/1900');
WITH source as
(
        SELECT EnumTypeId, EnumTypeName, ParentEnumTypeId,
LastModified, Ordinal
            FROM inbound.EnumType
            WHERE ParentEnumTypeId IS NULL
            AND
    (
                EnumTypeId = 'bb848254-3a25-4907-a7d0-a567f581ed61'
    )
        UNION ALL
        SELECT e.EnumTypeId, e.EnumTypeName, e.ParentEnumTypeId,
e.LastModified, e.Ordinal
            FROM inbound.EnumType e INNER JOIN source s
            ON e.ParentEnumTypeId = s.EnumTypeId )
INSERT INTO dbo.IncidentImpactvw(
```

APPENDIX V-continued

```
            EnumTypeId,
            IncidentImpactValue,
            ParentId,
            ID,
            Ordinal,
            InsertedBatchId,
            UpdatedBatchId)
SELECT distinct
        source.EnumTypeId,
        isnull(nameAlias.[DisplayName],
        source.EnumTypeName),
        parent.IncidentImpactId,
        source.EnumTypeName,
        source.Ordinal,
        @BatchId,
        0
FROM source
LEFT JOIN dbo.IncidentImpactvw parent ON (source.ParentEnumTypeId =
parent.EnumTypeId)
LEFT JOIN dbo.IncidentImpactvw dest ON (source.EnumTypeId =
dest.EnumTypeId)
LEFT JOIN inbound.DisplayString nameAlias ON (source.EnumTypeId =
nameAlias.LTStringId) AND (nameAlias.LanguageCode = 'ENU')
WHERE dest.EnumTypeId IS NULL
AND source.LastModified >= @SystemWorkItemTroubleTicketImpactEnumWM
AND source.LastModified < @SystemWorkItemTroubleTicketImpactEnummaxWM
SELECT @Inserted = @@RowCount, @err = @@error
IF(@err<>0)
BEGIN
            RAISERROR('Failed to insert into IncidentImpact Outrigger', 16,1)
            RETURN
END;
WITH source as
(
            SELECT EnumTypeId, EnumTypeName, ParentEnumTypeId,
LastModified, Ordinal
            FROM inbound.EnumType
            WHERE ParentEnumTypeId IS NULL
            AND
    (
                EnumTypeId = 'bb848254-3a25-4907-a7d0-a567f581ed61'
    )
            UNION ALL
            SELECT e.EnumTypeId, e.EnumTypeName, e.ParentEnumTypeId,
e.LastModified, e.Ordinal
            FROM inbound.EnumType e INNER JOIN source s
            ON e.ParentEnumTypeId = s.EnumTypeId )
UPDATE outriggerDest SET outriggerDest.EnumTypeId=finalDest.EnumTypeId,
            outriggerDest.IncidentImpactValue = finalDest.[EnumTypeName],
            outriggerDest.ParentId = finalDest.ParentId,
            outriggerDest.UpdatedBatchId = @BatchId,
            outriggerDest.ID = finalDest.ID,
            outriggerDest.Ordinal = finalDest.Ordinal
FROM
(
SELECT distinct
    source.EnumTypeId as EnumTypeId,
    isnull(nameAlias.[DisplayName], source.[EnumTypeName]) as EnumTypeName,
    parent.IncidentImpactId as ParentId,
    source.EnumTypeName as ID,
    source.Ordinal as Ordinal,
    @BatchId as UpdatedBatchId
FROM source
INNER JOIN dbo.IncidentImpactvw dest ON source.EnumTypeId =
dest.EnumTypeId
LEFT JOIN dbo.IncidentImpactvw parent ON source.ParentEnumTypeId =
parent.EnumTypeId
LEFT JOIN inbound.DisplayString nameAlias ON (source.EnumTypeId =
nameAlias.LTStringId) AND (nameAlias.LanguageCode = 'ENU')
WHERE dest.ParentId <> parent.IncidentImpactId OR source.EnumTypeName <>
dest.IncidentImpactValue
AND dest.EnumTypeId IS NOT NULL
AND source.LastModified >= @SystemWorkItemTroubleTicketImpactEnumWM
AND source.LastModified < @SystemWorkItemTroubleTicketImpactEnummaxWM
    )finalDest
    JOIN dbo.IncidentImpactvw outriggerDest ON
(finalDest.EnumTypeId=outriggerDest.EnumTypeId)
SELECT @Updated = @@RowCount,@err=@@error
IF(@err<>0)
BEGIN
```

APPENDIX V-continued

```
            RAISERROR('Failed to update IncidentImpact Outrigger', 16,1)
            RETURN
    END
    UPDATE #tempTable SET WaterMark =
    CONVERT(nvarchar(64),IsNull(@SystemWorkItemTroubleTicketImpactEnummax
    WM,WaterMark),109)WHERE
    WarehouseEntityName='System.WorkItem.TroubleTicket.ImpactEnum' AND
    WaterMarkType='DateTime'
    IF(@err<>0)
    BEGIN
            RAISERROR('Failed to update set watermark', 16,1)
            RETURN
    END
    SELECT @WaterMark = (SELECT ModuleName as "@ModuleName",
            ProcessName as "@ProcessName",
            @BatchId as "@BatchId",
            (SELECT distinct WarehouseEntityName as
    "@WarehouseEntityName",
            WarehouseEntityTypeName as
    "@WarehouseEntityTypeName",
            EntityGuid as "@EntityGuid",
            CASE WarehouseEntityTypeName
                WHEN 'Inbound' THEN 'DateTime'
                WHEN 'Enumeration' THEN 'DateTime'
                ELSE 'BatchId' END as "@WaterMarkType",
            CASE WarehouseEntityTypeName
                WHEN 'Inbound' THEN convert(nvarchar(64),
    WaterMark, 109)
                WHEN 'Enumeration' THEN convert(nvarchar(64),
    WaterMark, 109)
                ELSE cast(@BatchId as nvarchar(64)) END as
    "@WaterMark"
            FROM #tempTable
            FOR XML PATH('Entity'),type)
            FROM (SELECT distinct ModuleName, ProcessName FROM
    #tempTable) a
            FOR XML PATH('Module'),type)
    SELECT @WaterMark as WaterMark, @BatchId as BatchId, @Updated as
    UpdatedRowCount, @Inserted as InsertedRowCount
    CLEANUP:
            IF object_id('tempdb..#tempTable') IS NOT NULL
            BEGIN
                DROP TABLE #tempTable
            END
    SET NOCOUNT OFF
    END
```

What is claimed is:

1. A computer-implemented method for performing a transform in an extract, transform, and load process, the computer-implemented method comprising performing computer-implemented operations for:

storing, by a computing device, a data model mapping that maps data types within a data source type system implemented by one or more data sources to elements within a data warehouse, the elements including dimension data types, relationship fact data types and outrigger data types;

generating, by the computing device, program code that performs a transform of data retrieved from the one or more data sources based on the data model mapping, the transform including a dimension data type transform, a relationship fact data type transform and an outrigger data type transform, where the program code initializes a plurality of watermarks, the watermarks indicating a date and a time at which a previous dimension transform ended; and determining where a current dimension transform is to begin based on the plurality of watermarks, where dimension data types include information regarding specific descriptive aspects of an organization, relationship fact data types include information regarding multiple associations of data between a plurality of dimension data types and tracks changes of the associations, and outrigger data types include information regarding commonly associated data between at least two dimension data types, wherein the dimension data type transform further comprises updating, by the computing device, a destination dimension table attribute for a change in an existing element, inserting, by the computing device, new data into the destination dimension table for a new data object, and updating, by the computing device, the destination dimension table by marking an element as deleted for a data object that has been deleted from a data source, wherein the relationship fact data type transform further comprises determining, by the computing device, a relationship in a destination relationship table between data objects that need to be deleted, setting, by the computing device, a deleted time of a relationship to be deleted in the destination relationship table between objects to a time of creation of a new relationship between objects, and updating, by the computing device, the destination relationship table by marking the relationship to be deleted based on the time of creation of the new relationship, and wherein the outrigger data type transform further includes inserting, by the computing device, new enumerations in a destination outrigger table, and updating, by the computing device, existing enumerations in the destination outrigger table.

2. The computer-implemented method of claim 1, further comprising executing, by the computing device, the generated program code to transform the data retrieved from the one or more data sources prior to loading into the data warehouse.

3. The computer-implemented method of claim 1, wherein the data model mapping comprises data defining one or more properties that are processed in the dimension data type transform.

4. The computer-implemented method of claim 1, wherein the data defining one or more properties that are processed in the dimension data type transform comprises data specifying that only properties specified in the mapping for a dimension should be processed.

5. The computer-implemented method of claim 1, wherein the data defining one or more properties that are processed in the dimension data type transform comprises data specifying that new properties added to a dimension when the dimension is extended should also be processed.

6. The computer-implemented method of claim 1, wherein the data defining one or more properties that are processed in the dimension data type transform comprises data specifying that properties for a target class and a parent of the target class should be processed.

7. The computer-implemented method of claim 1, wherein the program code comprises structured query language (SQL) script.

8. A computer-readable storage medium that is not a signal having computer-readable instructions stored thereupon which, when executed by a computer, cause the computer to:
store a data model mapping that maps data types within a data source type system implemented by a data source to elements within a data warehouse;
generate program code that performs a transform of data retrieved from the data source based on the data model mapping, the transform including, a dimension data type transform, a relationship fact data type transform and an outrigger data type transform,
where the program code initializes a plurality of watermarks, the watermarks indicating a date and a time at which a previous dimension transform ended; and
determine where a current dimension transform is to begin based on the plurality of watermarks,
where elements within the data warehouse include
dimension data types include information regarding specific descriptive aspects of an organization,
relationship fact data types include information regarding multiple associations of data between a plurality of dimension data types and tracks changes of the associations, and
outrigger data types include information regarding commonly associated data between at least two dimension data types,
wherein the dimension data type transform further comprises
updating a destination dimension table attribute for a change in an existing element,
inserting new data into the destination dimension table for a new data object, and
updating the destination dimension table by marking an element as deleted for a data object that has been deleted from a data source,
wherein the relationship fact data type transform further comprises
determining a relationship in a destination relationship table between data objects that needs to be deleted,
setting a deleted time of a relationship to be deleted in the destination relationship table between objects to a time of creation of a new relationship between objects, and
updating the destination relationship table by marking the relationship to be deleted based on the time of creation of the new relationship, and
wherein the outrigger data type transform further includes inserting new enumerations in a destination outrigger table, and
updating existing enumerations in the destination outrigger table.

9. The computer-readable storage medium of claim 8, having further computer-executable instructions stored thereupon which, when executed by the computer, cause the computer to execute the generated program code to transform the data retrieved from the data source prior to loading into the data warehouse.

10. The computer-readable storage medium of claim 8, wherein the data model mapping comprises data defining one or more properties that are processed in the dimension data type transform.

11. The computer-readable storage medium of claim 8, wherein the data defining one or more properties that are processed in the dimension data type transform comprises data specifying that only properties specified in the mapping for a dimension should be processed.

12. The computer-readable storage medium of claim 8, wherein the data defining one or more properties that are processed in the dimension data type transform comprises data specifying that new properties added to a dimension when the dimension is extended should also be processed.

13. The computer-readable storage medium of claim 12, wherein the data defining one or more properties that are processed in the dimension data type transform comprises data specifying that properties for a target class and a parent of the target class should be processed.

14. A computer system for performing a transform in an extract, transform, and load process, the computer system comprising:
a central processing unit; and
a memory storing program code executable on the central processing unit which, when executed, causes the central processing unit
to store a data model mapping in the memory, the mapping comprising data mapping types within a data source type system implemented by a data source to elements within a data warehouse,
to generate program code based on the data model mapping that performs a dimension data type transform, a relationship fact data type transform, and an outrigger data type transform of data retrieved from the data source, where the program code initializes a plurality of watermarks, the watermarks indicating a date and a time at which a previous dimension transform ended,
to determine where a current dimension transform is to begin based on the plurality of watermarks, and to execute the generated program code on the central processing unit to transform the data retrieved from the data source prior to loading into the data warehouse, where the elements within the data warehouse include
- dimension data types include specific information regarding descriptive aspects of an organization,
- relationship fact data types include information regarding multiple associations of data between a plurality of dimension data types and tracks changes of the associations, and
- outrigger data types include information regarding commonly associated data between at least two dimension data types, wherein the dimension data type transform further comprises
- updating, by the computing device, a destination dimension table attribute for a change in an existing element,
- inserting, by the computing device, new data into the destination dimension table for a new data object, and
- updating, by the computing device, the destination dimension table by marking an element as deleted for a data object that has been deleted from a data source, wherein the relationship fact data type transform further comprises
- determining, by the computing device, a relationship in a destination relationship table between data objects that need to be deleted,
- setting, by the computing device, a deleted time of a relationship to be deleted in the destination relationship table between objects to a time of creation of a new relationship between objects, and
- updating, by the computing device, the destination relationship table by marking the relationship to be deleted based on the time of creation of the new relationship, and wherein the outrigger data type transform further includes:
- inserting, by the computing device, new enumerations in a destination outrigger table, and
- updating, by the computing device, existing enumerations in the destination outrigger table.

* * * * *